United States Patent
Kanno

(10) Patent No.: US 12,455,704 B2
(45) Date of Patent: Oct. 28, 2025

(54) MEMORY SYSTEM AND METHOD OF CONTROLLING NONVOLATILE MEMORY

(71) Applicant: Kioxia Corporation, Tokyo (JP)

(72) Inventor: Shinichi Kanno, Ota (JP)

(73) Assignee: Kioxia Corporation, Tokyo (JP)

( * ) Notice: Subject to any disclaimer, the term of this patent is extended or adjusted under 35 U.S.C. 154(b) by 112 days.

(21) Appl. No.: 18/461,603

(22) Filed: Sep. 6, 2023

(65) Prior Publication Data
US 2024/0201904 A1     Jun. 20, 2024

(30) Foreign Application Priority Data
Dec. 19, 2022   (JP) .................................. 2022-202322

(51) Int. Cl.
*G06F 3/00* (2006.01)
*G06F 3/06* (2006.01)

(52) U.S. Cl.
CPC .......... *G06F 3/0659* (2013.01); *G06F 3/0604* (2013.01); *G06F 3/0679* (2013.01)

(58) Field of Classification Search
CPC ..... G06F 3/0659; G06F 3/0604; G06F 3/0679
See application file for complete search history.

(56) References Cited

U.S. PATENT DOCUMENTS

| | | | |
|---|---|---|---|
| 10,338,846 B2 | 7/2019 | Nimmagadda | |
| 11,409,436 B2 | 8/2022 | Bavishi et al. | |
| 2007/0005922 A1 | 1/2007 | Swaminathan et al. | |
| 2016/0162186 A1* | 6/2016 | Kashyap | G06F 3/0688 711/103 |
| 2020/0089537 A1 | 3/2020 | Bahirat et al. | |
| 2021/0303206 A1 | 9/2021 | Saxena et al. | |

* cited by examiner

*Primary Examiner* — Craig S Goldschmidt
(74) *Attorney, Agent, or Firm* — Oblon, McClelland, Maier & Neustadt, L.L.P.

(57) ABSTRACT

According to one embodiment, a memory system includes a nonvolatile memory including dies, a controller, and a first queue, a second queue, and a command buffer provided for each die. In response to a read command to be executed being stored in the command buffer corresponding to a first die, the controller determines whether or not a next read command needs to be issued. In response to determining that the next read command needs to be issued, the controller identifies a second die in which second data subsequent to first data corresponding to the read command to be executed is stored, and stores a read command to read the second data in the second queue corresponding to the second die.

15 Claims, 13 Drawing Sheets

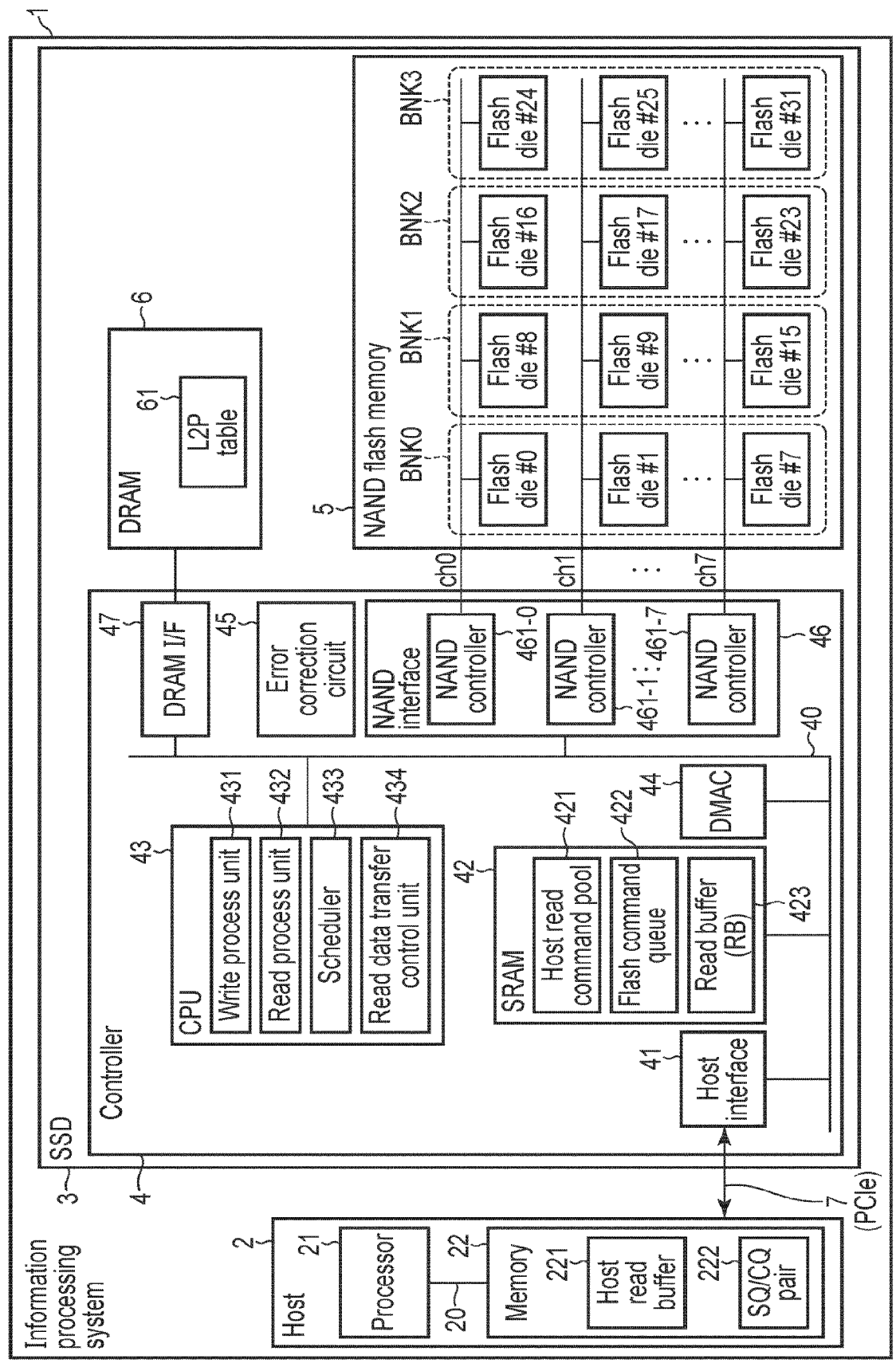
F I G. 1

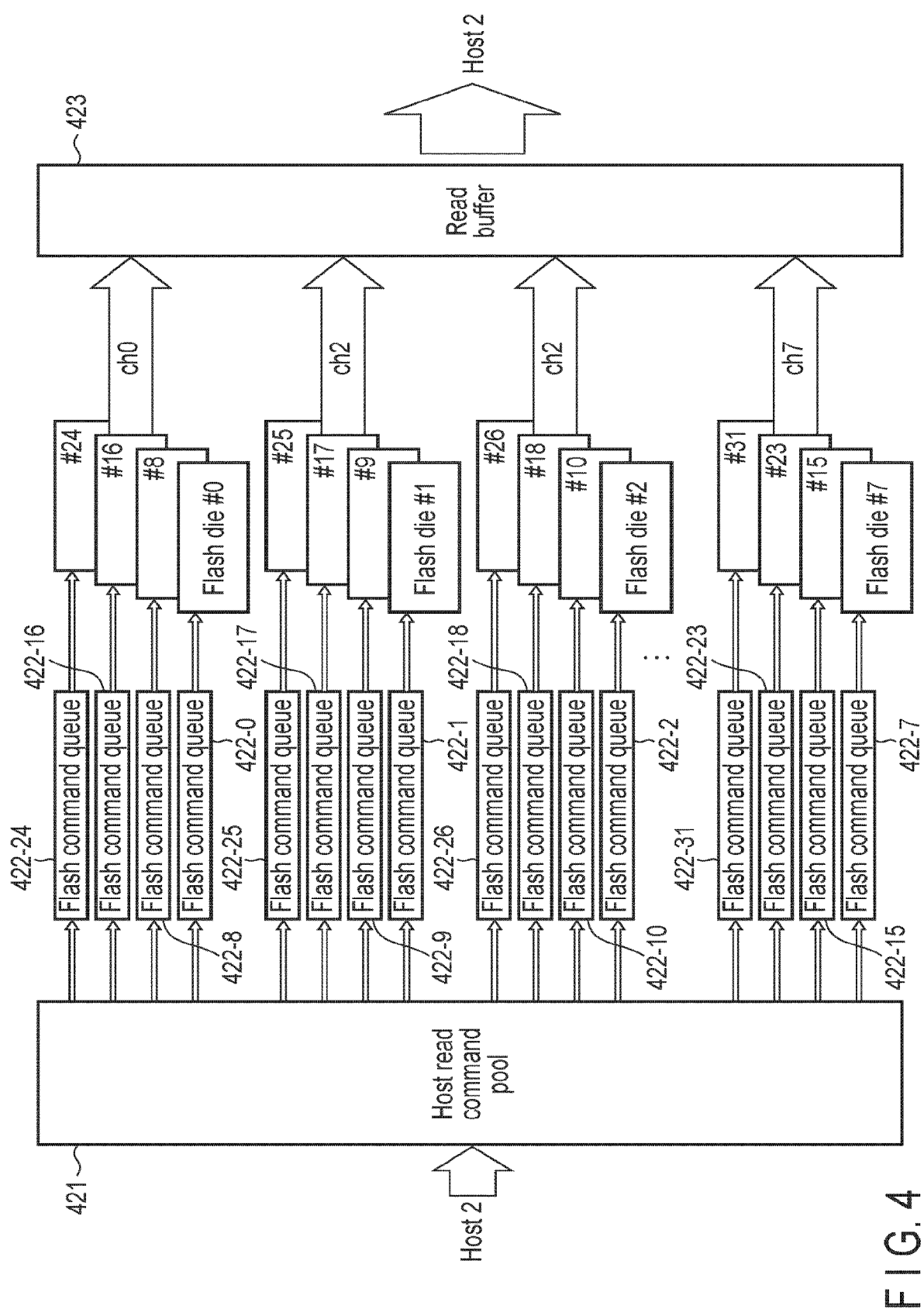
F I G. 4

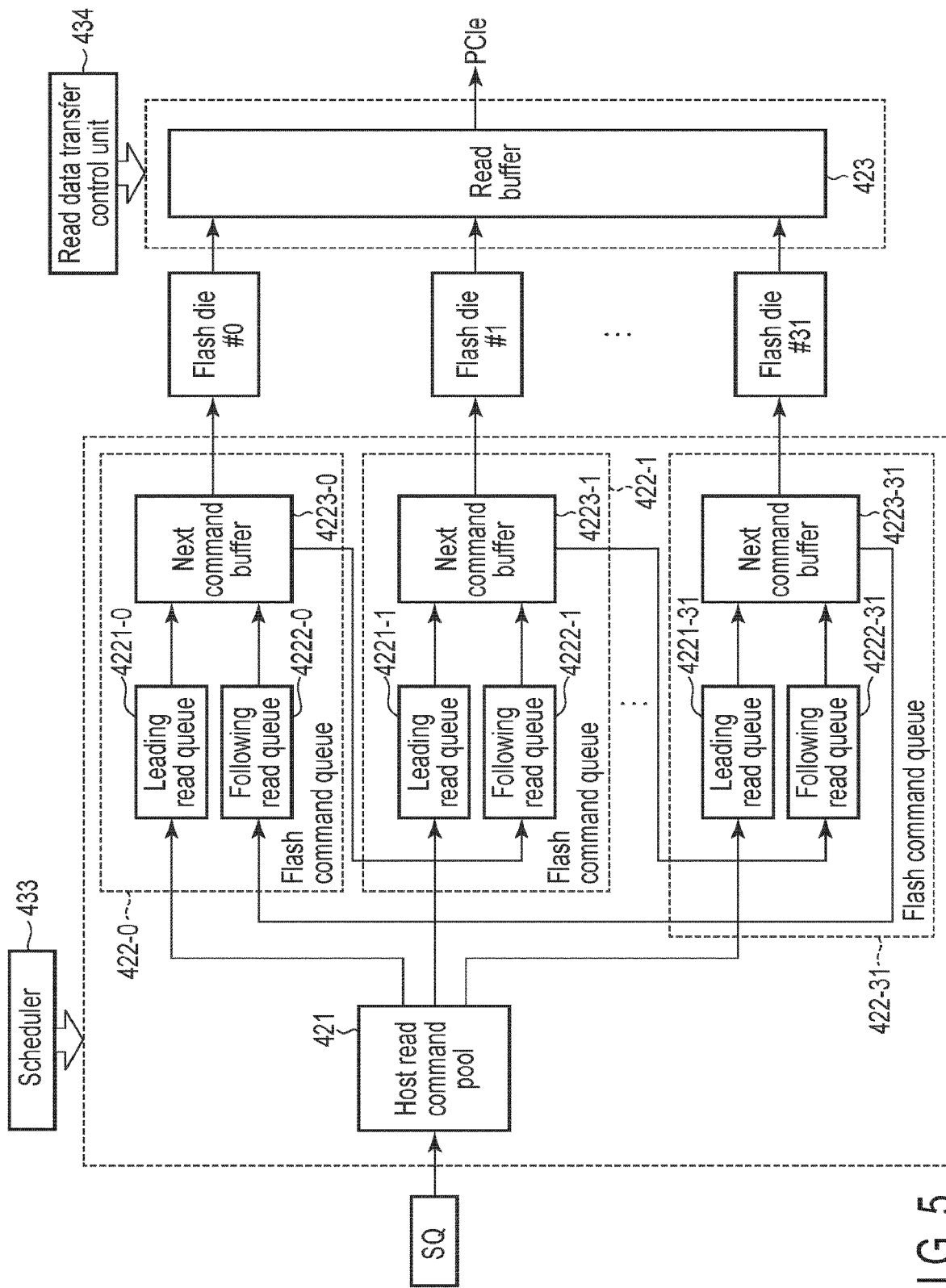
F I G. 5

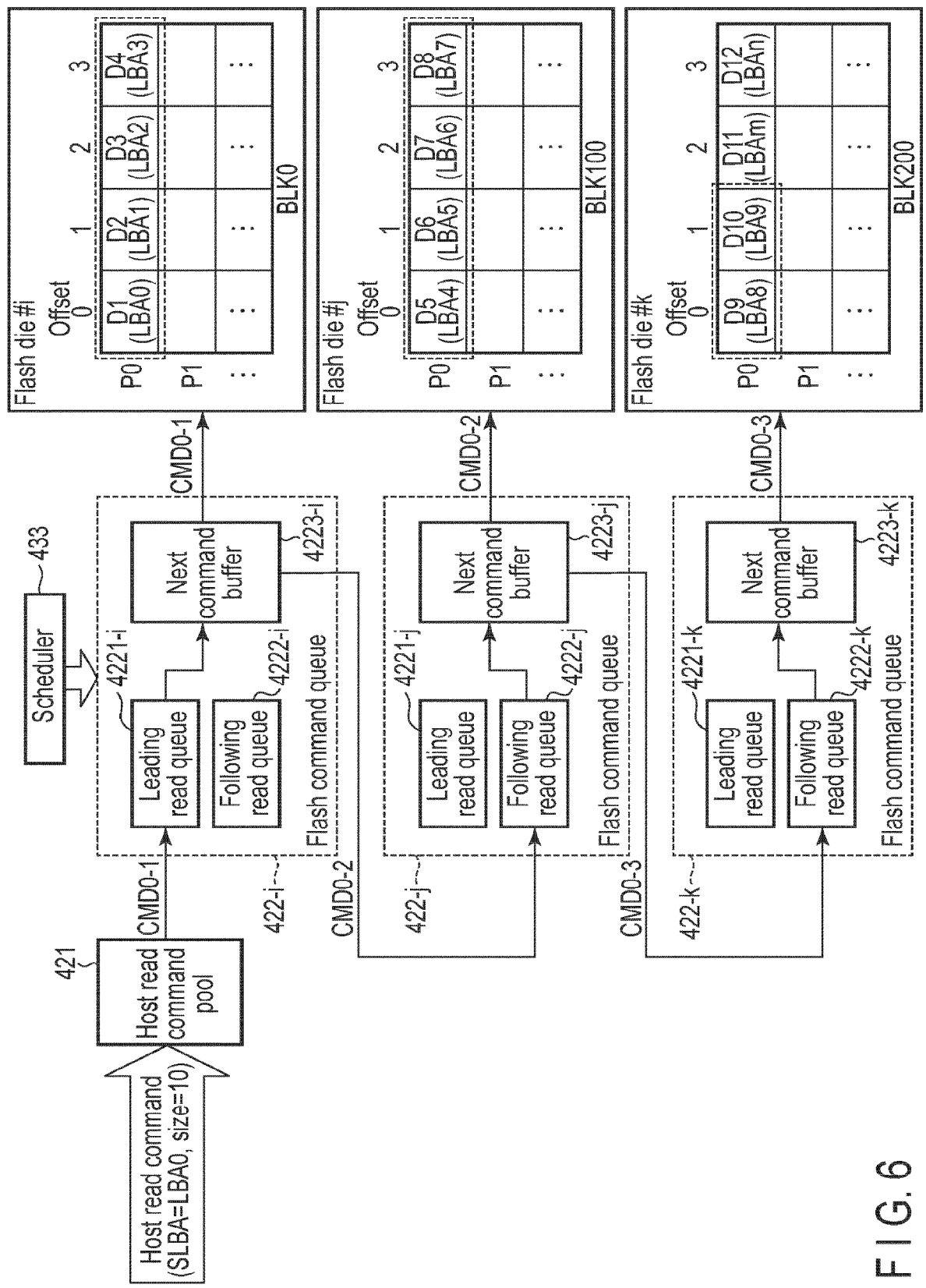
F I G. 6

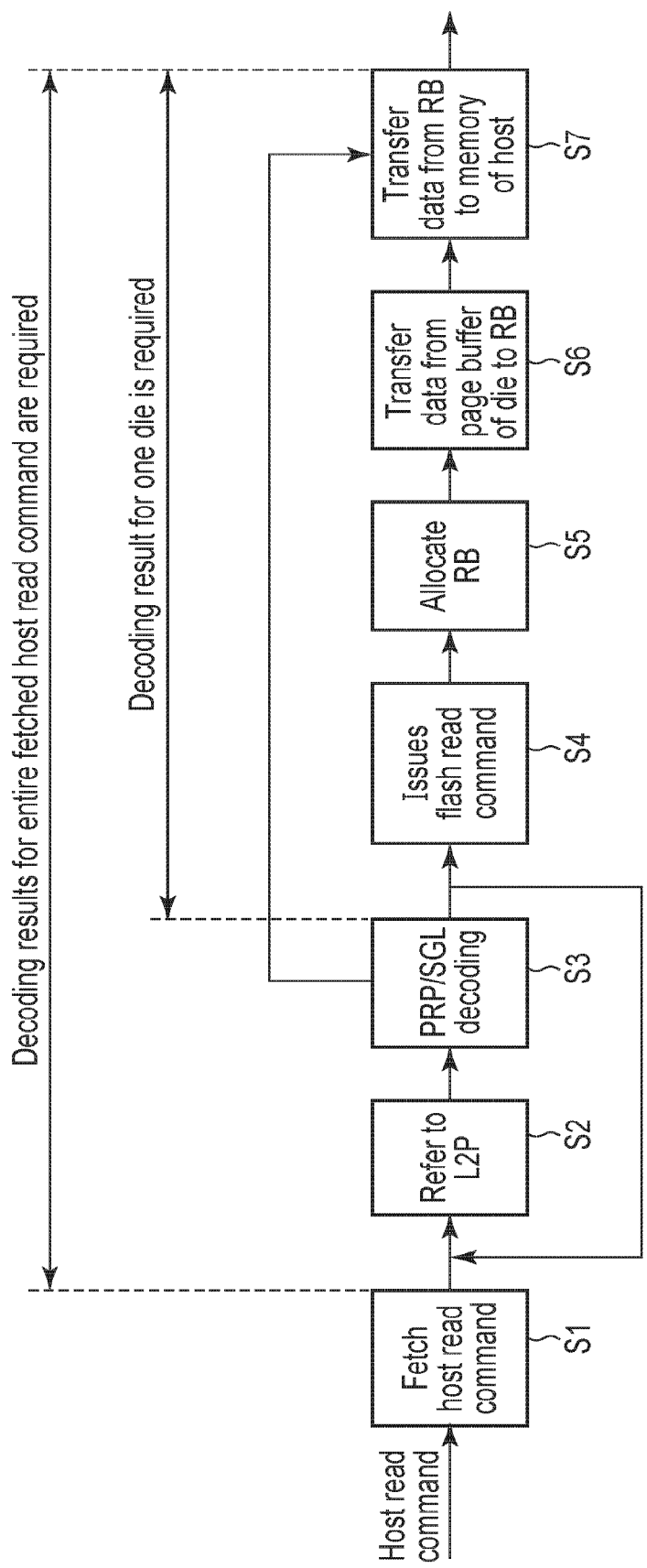
F I G. 7

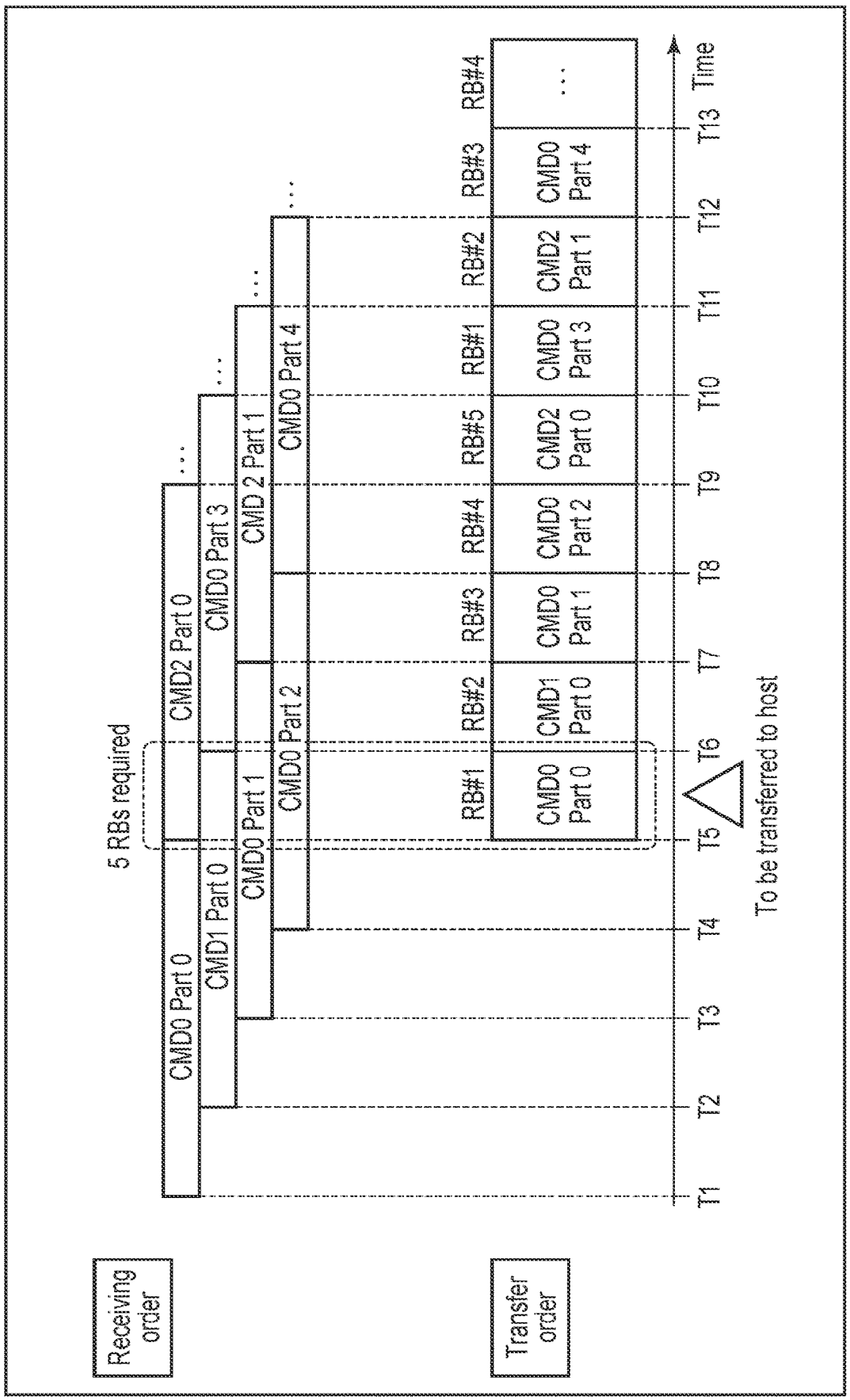
F I G. 8

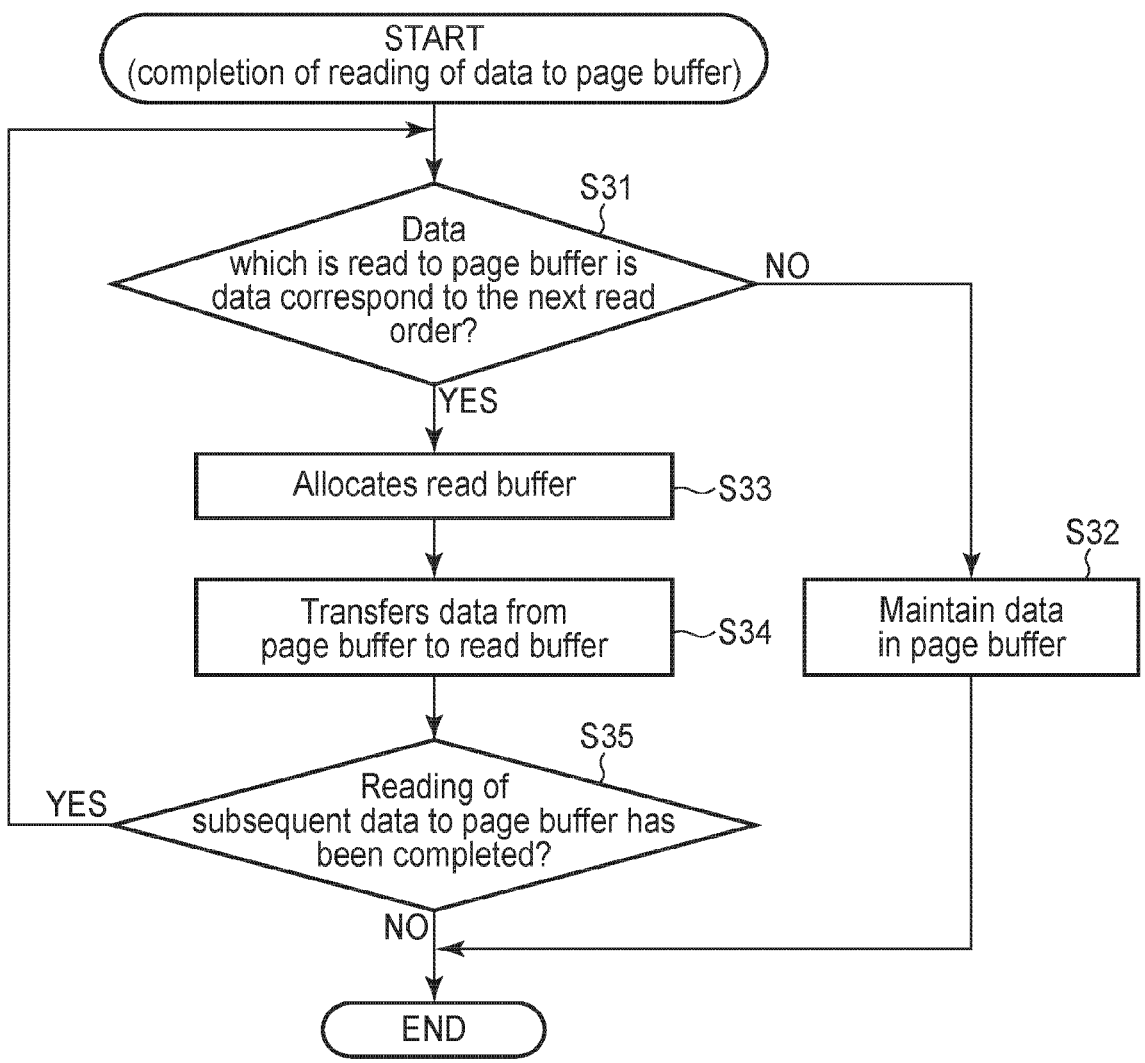
F I G. 12

MEMORY SYSTEM AND METHOD OF CONTROLLING NONVOLATILE MEMORY

CROSS-REFERENCE TO RELATED APPLICATIONS

This application is based upon and claims the benefit of priority from Japanese Patent Application No. 2022-202322, filed Dec. 19, 2022, the entire contents of which are incorporated herein by reference.

FIELD

Embodiments described herein relate generally to a memory system and a method of controlling a nonvolatile memory.

BACKGROUND

In recent years, memory systems that include a nonvolatile memory are widely used. As one of such memory systems, a solid state drive (SSD) that includes a NAND flash memory.

In the memory system such as the SSD, there is a need to improve the throughput of read process.

In addition, some hosts may require that read target data specified by a read request issued by the host are transferred to the host according to the order of leading data to last data which are included in the read target data.

In the memory system, there is a demand for a technique that can efficiently read data from the nonvolatile memory.

BRIEF DESCRIPTION OF THE DRAWINGS

FIG. 1 is a block diagram illustrating an example of a configuration of an information processing system that includes a memory system according to an embodiment.

FIG. 4 is a block diagram illustrating an example of the relationship between a host read command pool, a plurality of flash command queues, a plurality of dies, a plurality of channels, and a read buffer in the memory system according to the embodiment.

FIG. 5 is a block diagram illustrating an example of a configuration of each of the plurality of flash command queues in the memory system according to the embodiment.

FIG. 6 is a diagram illustrating an example of a read process executed in the memory system according to the embodiment.

FIG. 7 is a diagram illustrating an example of a procedure of a read process executed in the memory system according to the embodiment.

FIG. 8 is a timing chart illustrating an example of the order of receiving read data in the read buffer provided in the memory system according to the embodiment and an example of the order of transferring read data from the read buffer to the host.

FIG. 12 is a flowchart illustrating a procedure of a process which is executed at the time of completion of reading from the nonvolatile memory in the memory system according to the embodiment.

DETAILED DESCRIPTION

Figure 2:
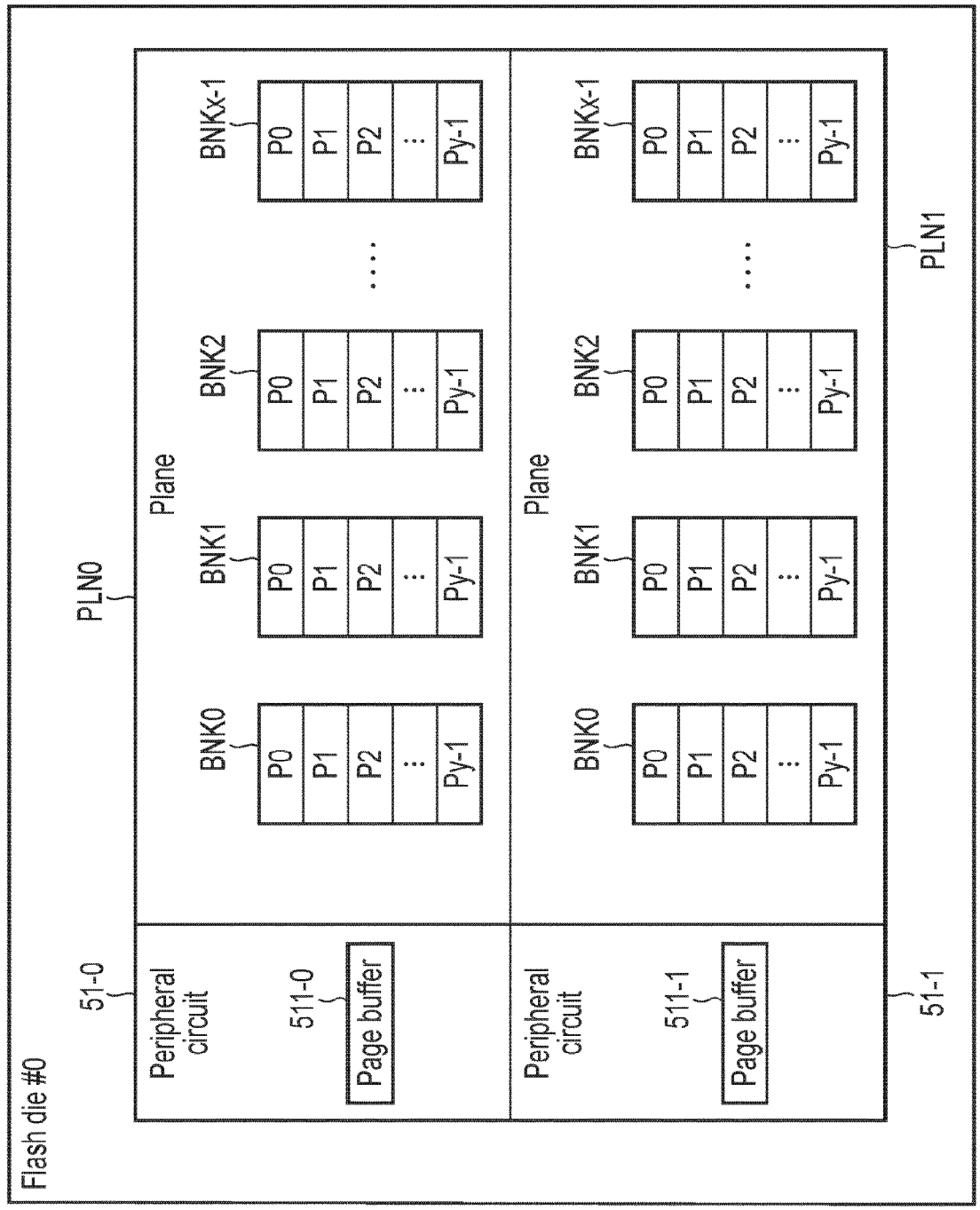
FIG. 2 is a block diagram illustrating an example of a configuration of one typical die among a plurality of dies included in a nonvolatile memory of the memory system according to the embodiment.

Various embodiments will be described hereinafter with reference to the accompanying drawings.

In general, according to one embodiment, a memory system comprises a nonvolatile memory including a plurality of dies, a controller configured to control the plurality of dies; and a first queue, a second queue and a command buffer provided for each of the plurality of dies. The first queue is a queue for storing a single read command associated with a read request from a host, or a leading read command of a plurality of read commands associated with a read request from the host. The second queue is a queue for storing any subsequent read command of the plurality of read commands. The command buffer is a buffer for storing a read command to be executed that is fetched from a queue selected from the first queue and the second queue. In response to the read command to be executed being stored in the command buffer corresponding to a first die of the plurality of dies, the controller determines whether or not a next read command subsequent to the read command to be executed needs to be issued, based on whether or not the read command to be executed is any other read command except for the single read command and a last read command of the plurality of read commands. In response to determining that the next read command needs to be issued, the controller refers to a logical-to-physical address translation table and identifies a second die in which second data subsequent to first data requested to be read by the read command to be executed is stored, and a length of the second data stored in the second die. The controller generates a read command to read the second data. The controller executes a process of transmitting the read command to be executed to the first die, and a process of storing the generated read command in the second queue corresponding to the second die.

In the following descriptions, It is assumed that the memory system of the embodiment is realized as a solid state drive (SSD). FIG. 1 is a block diagram illustrating an example of a configuration of an information processing system 1 that includes a memory system according to an embodiment. The information processing system 1 includes a host (host device) 2 and an SSD 3. The host 2 and the SSD 3 can be connected to each other via a bus 7.

The host 2 is an information processing device. The host 2 is, for example, a personal computer, a server computer or a mobile device. The host 2 accesses the SSD 3. More specifically, the host 2 issues, to the SSD 3, a write command that is a command to write data. Further, the host 2 issues, to the SSD 3, a read command that is a command to read data.

The SSD 3 is a storage device that can be connected to the host 2. The SSD 3 includes a nonvolatile memory. The SSD 3 can write data to the nonvolatile memory included SSD 3. The SSD 3 can as well read data from the nonvolatile memory included SSD 3.

Communication between the SSD 3 and the host 2 is executed via the bus 7. The bus 7 is a transmission path connecting the host 2 and the SSD 3 to each other. The bus 7 is, for example, a PCI Express™ (PCIe™) bus. The PCIe bus is a full duplex transmission path. The full duplex transmission path includes both a transmission path that transmits data and an input/output (I/O) command from the host 2 to the SSD 3 and a transmission path that transmits data and a response from the SSD 3 to the host 2. The I/O command is, for example, a command for writing or reading data to or from the nonvolatile memory. The I/O command is, for example, a write command or a read command. In the following descriptions, a write command issued by the host 2 may as well be referred to as a write request or a host write command. On the other hand, a read command issued from the host 2 may as well be referred to as a read request or a host read command.

As a standard of a logical interface for connecting the host 2 and the SSD 3, a standard of NVM Express™ (NVMe™) may be used. In the interface of the NVMe standard, communication between the host 2 and the SSD 3 is performed using a pair of queues that include at least one submission queue (SQ) and a completion queue (CQ) associated with the at least one submission queue (SQ). This pair of queues is referred to as a submission queue/completion queue pair (SQ/CQ pair).

Next, a configuration of the host 2 will be described.

The host 2 includes a processor 21 and a memory 22. The processor 21 and the memory 22 are interconnected via an internal bus 20.

The processor 21 is, for example, a CPU. The processor 21 executes software (host software) that is loaded to the memory 22 from the SSD 3 or another storage device connected to the host 2. The host software includes, for example, an operating system, a file system and application programs.

The memory 22 is, for example, a volatile memory. The memory 22 may as well be referred to as a main memory, system memory or host memory. The memory 22 is, for example, a dynamic random access memory (DRAM). A part of the memory region of the memory 22 is used as a host read buffer 221. The host read buffer 221 is a memory region to which read data that is read from the nonvolatile memory of the SSD 3 is to be transferred. The host read buffer 221 is allocated on the memory 22 by the host 2 for each host read command. The host read command includes a data pointer, which is a parameter that specifies location information indicating the location in the memory 22 to where the read data is to be transferred. This host read command can specify the location information to where the read data is to be transferred, by using a physical region page (PRP) entry, a PRP list, or a scatter gather list (SGL). For example, let us assume the case where the host read command uses a PRP entry to specify location information. In this case, the host read command includes a first PRP entry field (PRP1) and a second PRP entry field (PRP2). Each of PRP1 and PRP2 uses a PRP entry to specify a location (memory page) in the memory 22 to which read data is to be transferred. The PRP entry is a pointer to a memory page. The PRP entry includes a page base address of a memory page and an offset within the memory page. The page base address is an address that identifies a single memory page.

Another part of the memory area of the memory 22 is used to store a SQ/CQ pair 222. Each of the submission queues SQs included in the SQ/CQ pair 222 is a queue used to issue I/O commands (host write commands, host read commands) to the SSD 3. Each of the submission queues SQ includes a plurality of slots. Each of the plurality of slots can store one I/O command. The host 2 creates the submission queue SQ in the memory 22 of the host 2. Further, the host 2 issues a submission queue create command to the SSD 3. The address indicating the memory location in the memory 22 where the respective one of the submission queues SQs is created, the size of each of the submission queues SQs, the identifier of each of the completion queues CQ associated with these submission queues SQs and the like are notified to the SSD 3 by the submission queue create command.

The completion queue CQ included in the SQ/CQ pair is a queue used to receive a completion response from the SSD 3, which indicates completion of an I/O command. The completion response includes information indicating a status indicating success or failure of the processing of the completed command. The completion response may as well be referred to as a command completion or a command completion notification. The completion queue CQ includes a plurality of slots. Each of the plurality of slots can store one completion response. The host 2 creates the completion queue CQ in the memory 22 of the host 2. Further, the host 2 issues a completion queue create command to the SSD 3. The address indicating the memory location in the memory 22 where the completion queue CQ is created, the size of this completion queue CQ and the like are notified to the SSD 3 by the completion queue create command.

Next, an internal configuration of the SSD 3 will be described.

The SSD 3 includes a controller 4, and a NAND flash memory 5 as a nonvolatile memory. The SSD 3 may further include a random access memory, that is, for example, a dynamic random access memory (DRAM) 6, which is a volatile memory.

The controller 4 is a memory controller. The controller 4 is, for example, a control circuit such as a system-on-a-chip (SoC). The controller 4 is electrically connected to the NAND flash memory 5. The controller 4 executes a read process for reading data from the NAND flash memory 5 and a write process for writing data to the NAND flash memory 5, by processing I/O commands received from the host 2. As a physical interface connecting the controller 4 and the NAND memory 5, for example, a Toggle NAND flash interface, or an open NAND flash interface (ONFI) is used. The functions of each part of the controller 4 can be realized by dedicated hardware, a processor that executes programs, or a combination of these dedicated hardware and the processor.

The NAND flash memory 5 may be a flash memory of a two-dimensional structure or a flash memory of a three-dimensional structure. The NAND flash memory 5 includes, for example, a plurality of dies. A die may as well be referred to as a memory die, flash die, memory chip or flash chip. Each of these dies is realized as a NAND flash memory die. Hereafter, a die will be referred to as a flash die. FIG. 1 illustrates as an example the case where the NAND flash memory 5 includes 32 flash dies #0 to #31.

The DRAM 6 includes a memory region that stores, for example, a logical-to-physical address translation table (L2P table) 61. The L2P table 61 is a table that stores mapping information. The mapping information is information that indicates mapping between each of logical addresses and each of physical addresses of the NAND flash memory 5 in units of a predetermined management size. A logical address is an address used by the host 2 to access the SSD 3. As the logical address, for example, a logical block address (LBA) is used. The physical address is an address that indicates a storage location in the NAND flash memory 5. The physical address can be expressed, for example, by a combination of a flash die address, a block address, a page address, and an offset address within the page.

Next, an internal configuration of the controller 4 will be described. The controller 4 include, for example, a host interface (host I/F) 41, a static RAM (SRAM) 42, a CPU 43, a direct memory access controller (DMAC) 44, an error correction circuit 45, a NAND interface (NAND I/F) 46, and a DRAM interface (DRAM I/F) 47. The host interface 41, SRAM 42, CPU 43, DMAC 44, error correction circuit 45, NAND interface 46 and DRAM interface 47 are interconnected via an internal bus 40.

The host interface 41 is a communication interface circuit that executes communications with the host 2. The host interface 41 is realized, for example, by a PCIe controller. Further, the host interface 41 includes an arbitration mechanism. The arbitration mechanism is a mechanism that selects a submission queue SQ from which the I/O command is to be fetched, from a plurality of submission queues SQs included in the SQ/CQ pair 222. The arbitration mechanism is, for example, a round-robin arbitration mechanism or a weighted round-robin arbitration mechanism.

The SRAM 42 is a volatile memory. The memory region of the SRAM 42 is used, for example, as a work area of the CPU 43. The SRAM 42 includes, for example, a memory region for storing a host read command pool 421, a memory region for storing a flash command queue 422 and a memory region for storing a read buffer (RB) 423.

The host read command pool 421 is a memory region used to store a group of host read commands among a plurality of I/O commands issued by the host 2. Each of the host read commands specifies a start LBA (SLBA), data length, data pointer and the like. The start LBA (SLBA) indicates the first LBA of one or more LBAs corresponding to a read target data. The data length indicates the length of the read target data, that is, the size of the read target data. The data length may be expressed by the number of LBAs. The data pointer is location information indicating the location in the memory 22 of the host 2, to where the read target data is to be transferred.

The flash command queue 422 is an internal queue where a group of read commands (flash read commands) to read data from the flash memory 5 are stored. The flash command queue 422 is provided for each flash die. The flash command queue 422 corresponding to a certain flash die stores read commands (also referred to as flash read commands) for reading data from this flash die. Details of the flash command queue 422 will be described later with reference to FIGS. 3 and 4.

The read buffer (RB) 423 is a data buffer for temporarily storing read data which is read from the flash memory 5. The read buffer (RB) 423 is used to improve the throughput of the read process in the SSD 3. The throughput of the read process indicates the amount of read data transferred from the SSD 3 to the host 2 per unit time. The read data is data (user data) read from the flash memory 5.

The CPU 43 is a processor. The CPU 43 loads a control program (firmware) stored in the flash memory 5 or in ROM (not shown) into the SRAM 42. Then, the CPU 43 performs various processes by executing the firmware. Note that the firmware may as well be loaded into the DRAM 6.

The CPU 43 performs, as a flash translation layer (FTL), for example, management of the data stored in the flash memory 5 and management of blocks included in the flash memory 5. The management of the data stored in the flash memory 5 includes, for example, management of mapping information. The CPU 42 manages mapping between each of logical addresses and each of physical addresses in units of management size using the mapping information in the L2P table 61. The management size is, for example, 4 KiB.

In the flash memory 5, data can be written to a page in a block only once per program/erase cycle of this block. That is, new data cannot be directly overwritten to a storage location (physical storage location) in a block where data has already been written. Therefore, when updating data that has already been written to a physical storage location within a block, the controller 4 writes the new data to an unwritten page (free page) within that block (or another block) and treats the previous data as invalid data. In other words, the controller 4 writes the updated data corresponding to a certain logical address to other physical storage location other than the physical storage location where the previous data corresponding to this logical address is stored. Then, the controller 4 updates the L2P table 61 to associate, with this logical address, a physical address that indicates this other physical storage location.

The management of blocks included in the flash memory 5 includes management of defective blocks (bad blocks) in the flash memory 5, wear leveling and garbage collection (GC).

The GC is an operation to increase the number of free blocks. A free block means a block that does not contain valid data. The controller 4 manages the status of each block (free block, active block, written pages, free pages, the amount of valid data, the amount of invalid data and the like). In the GC operation, the controller 4 selects some blocks that store a mixture of valid data and invalid data as GC source blocks. The GC source blocks may as well be referred to as copy destination blocks. The controller 4 copies the valid data stored in the GC source block to a GC destination block (for example, free block). A GC destination block may as well be referred to as a copy destination block. Here, valid data means data associated with a logical address. Data associated with a logical address as the latest data is valid data and may be read from the host 2 later. Invalid data means data that is not associated with any logical address. The data not associated with any logical address is data that has no possibility to be read from the host 2. When valid data is copied from the GC source block to the GC destination block, the controller 4 updates the L2P table 61 to map the copy destination physical addresses to the logical addresses of the copied valid data. The block that is left with only invalid data due to the valid data being copied to another block is released as a free block. With this operation, this block can be reused for writing data after the execution of the data erase operation for this block.

The DMAC 44 is a circuit that executes direct memory access (DMA). The DMAC 44 performs data transfer between the memory 22 of the host 2 and the SRAM 42 (or DRAM 6). For example, in a read process, the DMAC 44 executes a process of transferring read data from the flash memory 5 to the read buffer (RB) 423 and a process of transferring the read data from the read buffer (RB) 423 to the memory 22 of the host 2.

The error correction circuit 45 executes an encoding process when data is to be written to the flash memory 5. In the encoding process, the error correction circuit 45 adds an error correction code (ECC) as a redundancy code to the data to be written to the flash memory 5. When data is read from the flash memory 5, the error correction circuit 45 executes the decoding process. In the decoding process, the error correction circuit 45 executes the error correction of the data read from the flash memory 5 by using the ECC added to the data.

The NAND interface 46 is a circuit that controls the NAND flash memory 5. The NAND interface 46 is electrically connected to a plurality of flash dies included in the NAND flash memory 5.

Each of individual flash dies can operate independently. Therefore, the flash die functions as a unit that can operate in parallel. The NAND interface 46 includes, for example, NAND controllers 461-0, 461-1, . . . , 461-7. The NAND controllers 461-0, 461-1, . . . , 461-7 are connected to channels ch0, ch1, . . . , ch7, respectively. The controllers 461-0, 461-1, . . . , 461-7 are each connected to one or more flash dies via the corresponding channel. FIG. 1 illustrates an example case in which four flash dies are connected to each of the channels ch0, ch1, . . . , ch7. In this case, the NAND controller 461-0 is connected to flash dies #0, #8, #16 and #24 via the channel ch0. The NAND controller 461-1 is connected to flash dies #1, #9, #17 and #25 via the channel ch1. Further, the NAND controller 461-7 is connected to flash dies #7, #15, #23 and #31 via the channel ch7. The flash dies #0, #1, . . . , and #7 are handled by the controller 4 as a bank BNK0. The flash dies #8, #9, . . . , #15 are handled by the controller 4 as a bank BNK1. The flash dies #16, #17, . . . , #23 are handled by the controller 4 as a bank BNK2. The flash dies #24, #25, . . . , #31 are handled by the controller 4 as a bank BNK3. A bank is a unit in which a plurality of flash dies are operated in parallel by interleaving operations.

In the configuration of the NAND flash memory 5 shown in FIG. 1, the controller 4 can access flash die #0 to #31 in parallel via seven channels and bank interleaving operation. Therefore, the controller 4 can execute writing or reading of data to a maximum of 32 flash dies in parallel (the number of parallel accesses=32). Note that each of the flash dies #0 to #31 may have a multiplane configuration including a plurality of planes. For example, when each of flash dies #0 to #31 contains two planes, the controller 4 can execute data writing or reading to or from to a maximum of 64 planes in parallel (the number of parallel accesses=64).

The DRAM interface 47 is a circuit that controls the DRAM 6. The DRAM interface 47 stores data in the DRAM 6. Further, the DRAM interface 47 reads data stored in the DRAM 6.

Next, the functional configuration of the CPU 43 will be described. The CPU 43 includes a write process unit 431, a read process unit 432, a scheduler 433 and a read data transfer control unit 434, in addition to components that function as FTL. Each of the write process unit 431, read process unit 432, scheduler 433, and read data transfer control unit 434 may be partially or fully realized by dedicated hardware in the controller 4.

The write process unit 431 executes a write process by processing each write request (host write command) received from the host 2. The write process includes, for example, a process of acquiring the write data associated with the host write command from the memory 22 of the host 2, a process of writing the write data to the storage location in the NAND flash memory 5, and a process of updating the L2P table 61 to map the physical address indicating the storage location where the write data is written, to the logical address specified by the host write command.

The read process unit 432 executes a read process by processing each read request (host read command) received from the host 2. The read process includes, for example, a process of translating a logical address specified by a host read command into a physical address by referring to the L2P table 61, a process of calculating location information indicating the location on the memory 22 of the host 2 to where data is to be transferred, based on the data pointer specified by the host read command (this process may as well be a PRP/SGL decoding process), a process of reading data from the storage location in the NAND flash memory 5 indicated by the physical address, and a process of transferring the read data to the location on the memory 22 of the host 2 indicated by the calculated location information.

The read process executed by the read process unit 432 can be broadly divided into a scheduling process and a read data transfer process. The scheduling process is a process of issuing, to one or more flash dies, one or more read commands for reading data from the NAND flash memory 5, based on each read request received from the host 2. Each read command for reading data from the NAND flash memory 5 may include, for example, a physical address indicating the physical storage location where the data to be read is stored and the length of the data.

This scheduling process is executed by the scheduler 433. The read data transfer process is a process that transfers the read data read from each flash die to the memory 22 of the host 2 (host read buffer 221). This read data transfer process is executed by the read data transfer control unit 434. The scheduler 433 and the read data transfer control unit 434 may be realized as components of the read process unit 432.

The scheduler 433 executes the scheduling process so that the number of flash dies on which data read operations are executed in parallel, that is, the number of parallel reads, can be maximized in order to maximize the throughput of the read process. Further, the scheduler 433 executes the scheduling process so that the read target data specified by the read request (host read command) received from the host 2 can be transferred to the host 2 in the order of the leading data to the last data included in the read target data.

The scheduling process uses the host read command pool 421 and the flash command queue 422 provided for each flash die.

The host read command pool 421 is used to store command management information indicating the contents of each read request (host read command). For example, one command management information may be held in the host read command pool 421 for one read request. The command management information may include information specified by the corresponding host read command, that is, for example, the start LBA, data length, data pointer and the like.

The flash command queue 422 corresponding to one flash die includes a first queue, a second queue, and a command buffer.

The first queue is a queue for storing a single read command associated with a host read command from the host 2 or a leading read command of a plurality of read commands associated with a host read command from the host 2. The single read command associated with the host read command is one read command for reading read target data specified by this host read command from one flash die. If the flash die in which the read target data is stored is, for example, a flash die #m, the scheduler 433 stores the read command to read this read target data in the first queue corresponding to the flash die #m.

On the other hand, the leading read commands of the plurality of read commands associated with the host read command is one read command to read the leading data of the read target data specified by this host read command from a certain one flash die. When the size of the read target data is relatively large, the read target data may be stored across two or more flash dies. When the flash die in which the leading data of the read target data is stored is, for example, a flash die #m, then the scheduler 433 stores the leading read command of the plurality of read commands associated with the host read command, that is, a read command to read the leading data of the read target data, in the first queue corresponding to the flash die #m.

The second queue is a queue for storing any subsequent read command of the plurality of read commands associated with the host read command. Any subsequent read command of the plurality of read commands is the second or later read command of the plurality of read commands. For example, when the second data of the read target data specified by a certain host read command is stored in the flash die #m, the scheduler 433 stores a read command to read the second data, that is, the second read command of the plurality of read commands associated with this host read command, in the second queue corresponding to the flash die #m. Further, when the third data of the read target data is stored in the flash die #n, the scheduler 433 stores a read command to read the third data, that is, the third read command of the plurality of read commands associated with this host read command, in the second queue corresponding to the flash die #n.

The command buffer is a buffer for storing a read command to be executed that is fetched from a queue selected from the first and second queues. For example, in the command buffer corresponding to the flash die #m, a read command to be executed, which is fetched from the queue selected from the first queue corresponding to the flash die #m and the second queue corresponding to the flash die #m, is stored as a read command to be sent to the flash die #m.

In response to a read command to be executed being stored in the command buffer corresponding to a certain flash die (for example, flash die #m), the scheduler 433 determines whether or not a next read command subsequent to the read command to be executed needs to be issued, based on whether or not this read command to be executed is any other read command except for the single read command and a last read command of the plurality of read commands.

To each of the read commands stored in the first queue and the second queue, information indicating the relationship between the corresponding host read command and this read command, and a command pointer, which is a pointer to the command management information of the corresponding host read command, may be added as additional information.

The information indicating the relationship between the host read command and this read command may include, for example, offset information indicating the offset from a leading read command of one or more read commands associated with the host read command to this read command, and end information indicating that this read command is the last read command of one or more read commands associated with the host read command. For example, a read command represented by "CMDx Part0" or "CMDx-1" is the first read command associated with the host read command CMDx. A read command represented by "CMDx Part1" or "CMDx-2" is the second read command associated with the host read command CMDx. When this second read command is the last read command associated with the host read command CMDx, the additional information of the second read command may further include end information. A single read command associated with a given host read command CMDx may be represented by "CMDx Part0" or "CMDx-1". Since the single read command is also the last read command, the additional information for the single read command may further include end information.

The command pointer is an address indicating a memory location in the SRAM 42, where the command management information (start LBA, data length, data pointer, etc.) for the corresponding host read command is stored.

The scheduler 433 can determine whether the read command to be executed is any other read command except for the single read command and a last read command of the plurality of read commands, based on the additional information added to the read command to be executed, or based on both the additional information and the command management information.

When the read command to be executed is the single read command, or when the read command to be executed is the last read command of the plurality of read commands, the scheduler 433 determines that a next read command subsequent to the read command to be executed needs to be issued.

On the other hand, when the read command to be executed is the leading or middle read command of the plurality of read commands, the scheduler 433 determines that a next read command subsequent to the read command to be executed needs to be issued, that is, the next data subsequent to the data to be read from the flash die #m by the read command to be executed, needs to be read.

In response to determining that the next read command needs to be issued, the scheduler 433 refers to the L2P table 61 and identifies the die (flash die #n) on which the data (second data) subsequent to the data (first data) that is requested to be read by the read command to be executed is stored, and the length of the second data stored in the flash die #n. Then, the scheduler 433 generates a read command to read the second data.

After generating the read command to read the second data, the scheduler 433 executes a process of transmitting the read command to be executed to the flash die #m and a process of storing the generated read command in the second queue corresponding to the flash die #n.

According to the scheduling process described above, when the read target data specified by one host read command is dispersed over a plurality of flash dies, a plurality of read commands corresponding to the leading data to the last data of this read target data to last data, respectively, can be transmitted to a plurality of flash dies in the order of the leading command to the last command of the plurality of read commands. As a result, it is possible to read from the NAND flash memory 5 the read target data in the order of the leading data to the last data contained in that read target data.

In addition, in the scheduling process described above, in response to a read command to be executed being stored in the command buffer corresponding to a certain flash die (for example, flash die #m), that is, in response to determining that a certain read command is to be transmitted to the flash die #m via the command buffer corresponding to the flash die #m, a flash die in which the second data is stored and the length of the second data are identified. Thus, it becomes possible to execute the process of identifying the flash die in which the second data is stored and the length of the second data while the read operation corresponding to the read command preceding the read command to be executed is being executed on the flash die #m. While the read operation corresponding to the read command preceding the read command to be executed is being executed on the flash die #m, the read command to be executed cannot be transmitted to the flash die #m. Therefore, the flash die in which the second data is stored and the length of the second data can be efficiently identified by utilizing the stand-by time to wait for the completion of the read operation corresponding to the preceding read command.

In this manner, as compared to the case where all of the flash dies in which a plurality of data included in the read target data are stored respectively are identified first, the leading read command to read the leading data included in the read target data can be stored quickly in the first queue corresponding to the flash die in which the leading data is stored.

Here, an example of the process of identifying the flash die in which the first data is stored, the length of the first data stored in this flash die, another flash die in which the second data subsequent to the first data is stored, and the length of the second data stored in this other flash die will be described. It is assumed that the length of the read target data specified by the host read command is 8 (=8 LBA=32 KiB), the length of the first data is 4 (=4 LBA=16 KiB), the length of the second data is 4 (=4 LBA=16 KiB), and the first data and the second data are dispersed on two flash dies.

In the process of identifying the flash die in which the first data is stored, the scheduler 433 acquires the physical address associated with the start LBA specified by the host read command from the L2P table 61, for example. The scheduler 433 then identifies the flash die in which the first data is stored, based on the acquired physical address (for example, the upper bit portion of the acquired physical address).

In the process of identifying the length of the first data stored in the identified flash die, the scheduler 433 acquires the physical address associated with the start LBA+1 from the L2P table 61, for example. When the physical address associated with the start LBA and the physical address associated with the start LBA+1 are consecutive physical addresses in the same flash die, the scheduler 433 changes the value indicating the length of the first data from 1 to 2. The scheduler 433 then acquires the physical address associated with the start LBA+2 from the L2P table 61. When the physical address associated with the start LBA+1 and the physical address associated with the start LBA+2 are consecutive physical addresses in the same flash die, the scheduler 433 increases the value indicating the length of the first data by 1 and changes the value indicating the length of the first data from 2 to 3. The scheduler 433 then acquires the physical address associated with the start LBA+3 from the L2P table 61. When the physical address associated with the start LBA+2 and the physical address associated with the start LBA+3 are consecutive physical addresses in the same flash die, the scheduler 433 increases the value indicating the length of the first data by 1 and changes the value indicating the length of the first data from 3 to 4. The scheduler 433 then acquires the physical address associated with the start LBA+4 from the L2P table 61. When the flash die corresponding to the physical address associated with the start LBA+4 is different from the flash die corresponding to the physical address associated with the start LBA+3, the scheduler 433 determines that the length of the first data is 4. The scheduler 433 then generates a read command CMD-0 to read the first data, and stores the generated read command CMD-0 in the first queue corresponding to the flash die in which the first data is stored. The read command CMD-0 includes, for example, the physical address associated with the start LBA, data length (=4), command pointer, offset information and the like. Note here that the scheduler 433 may update the command management information on the SRAM 42 so that the information indicating the contents of the read command CMD-0 is added to the command management information.

In the process of identifying the flash die in which the second data is stored, the scheduler 433 may identify the start LBA+4 as the first LBA of the second data. Here, the numeral "4" means the data length of the first data specified by the read command CMD-0. The start LBA can be acquired by referring to the command management information using the pointer specified by the read command CMD-0.

The scheduler 433 acquires the physical address associated with the start LBA+4 from the L2P table 61. The scheduler 433 then identifies the flash die in which the second data is stored based on the acquired physical address (for example, the upper bit portion of the acquired physical address).

In the process of identifying the length of the second data stored in the identified flash die, the scheduler 433 acquires, for example, the physical address associated with start LBA+5 from the L2P table 61. When the physical address associated with the start LBA+4 and the physical address associated with the start LBA+5 are consecutive physical addresses in the same flash die, the scheduler 433 changes the value indicating the length of the second data from 1 to 2. The scheduler 433 then acquires the physical address associated with start LBA+6 from the L2P table 61. When the physical address associated with the start LBA+5 and the physical address associated with the start LBA+6 are consecutive physical addresses in the same flash die, the scheduler 433 increases the value indicating the length of the second data by 1 and changes the value indicating the length of the second data from 2 to 3. The scheduler 433 then acquires the physical address associated with the start LBA+7 from the L2P table 61. When the physical address associated with the start LBA+6 and the physical address associated with the start LBA+7 are consecutive physical addresses in the same flash die, the scheduler 433 increases the value indicating the length of the second data by 1 and changes the value indicating the length of the second data from 3 to 4. The sum of the length of the first data and the current length of the second data matches the data length indicated by the command management information. Therefore, the scheduler 433 determines that the length of the second data is 4. The scheduler 433 then generates a read command CMD-1 to read the second data, and stores the generated read command CMD-1 in the second queue corresponding to the flash die in which the second data is stored. The read command CMD-1 includes, for example, the physical address associated with the start LBA+4, data length (=4), command pointer, offset information and the like. Note here that the scheduler 433 may update the command management information on the SRAM 42 so that information indicating the contents of the read command CMD-1 is further added to the command management information.

The read data transfer control unit 434 executes a data transfer control process of transferring the read target data specified by the host read command received from the host 2 to the host 2 in the order of the leading data to the last data included in the read target data.

The time required for data read operation (read time tR) may differ for each flash die. Therefore, in order to ensure that the read target data is read from the flash dies in the order of the leading data to the last data included in that read target data, the read data transfer control unit 434 executes the following processing.

Here, it is assumed that after the read command to be executed, which is a read command to read the first data, is transmitted to flash die #m, the next read command to read the second data subsequent to the first data is transmitted to the flash die #n.

After completion of the reading of the first data to the page buffer of the flash die #m, the read data transfer control unit 434 reads the first data from the page buffer of the flash die #m. In other words, in the flash die #m, the operation of reading the first data from the memory cell array to the page buffer (sense operation) is executed. When the sense operation is completed in the flash die #m, the read data transfer control unit 434 reads the first data from the page buffer of the flash die #m.

Then, after completion of both reading of the first data to the page buffer of the flash die #m and reading of the second data to the page buffer of the flash die #n, the read data transfer control unit 434 reads the second data from the page buffer of the flash die #n.

That is, when the reading of the second data to the page buffer of the flash die #n is completed while the reading of the first data to the page buffer of flash die #m has not been completed, the read data transfer control unit 434 does not read the second data from the page buffer of the flash die #n, but waits until the reading of the first data to the page buffer of the flash die #m is completed. After completion of the reading of the first data to the page buffer of the flash die #m, the read data transfer control unit 434 executes the process of reading the first data from the page buffer of the flash die #m and the process of reading the second data from the page buffer of the flash die #n.

Thus, the process of sorting the plurality of data contained in the read target data in the order of the leading data to the last data is executed by controlling the timing of reading data from the page buffer of each flash die. In this manner, even if tR is different from one flash die to another, the read target data can be transferred to the host 2 in the order of the leading data to the last data included in the read target data.

The read data transfer control unit 434 executes the process of allocating the read buffer 423 to each of the plurality of flash dies as follows.

Note that here, such a case is assumed that after the read command to be executed to read the first data is transmitted to flash die #m, the next read command to read the second data subsequent to the first data is transmitted to flash die #n.

In response to completion of the reading of the first data to the page buffer of the flash die #m, the read data transfer control unit 434 allocates the first read buffer, which is one memory region in the read buffer 423, to the flash die #m, and transfers the first data to the first read buffer from the page buffer of the first die.

In response to completion of the reading of the second data to the page buffer of the flash die #n, the read data transfer control unit 434 determines whether or not the first read buffer has already been allocated to the flash die #m. When the first read buffer has already been allocated to the flash die #m, the read data transfer control unit 434 allocates a second read buffer, which is another memory region in the read buffer 423, to the flash die #n, and transfers the second data from the page buffer of the flash die #n to the second read buffer.

Thus, it is possible to prevent data, which cannot be transferred to the host 2, from remaining in the read buffer 423 for a long time, and thus the capacity of the read buffer 423 that needs to be provided in the SSD 3 can be minimized.

Next, the configuration of the flash dies will be described. FIG. 2 is a block diagram illustrating an example of a configuration of one typical die among the plurality of flash dies included in the NAND flash memory 5. The other flash dies have a configuration basically similar to this one typical die.

Here, a configuration example of the flash die #0 among the plurality of flash dies is shown as a typical one. The other flash dies have the same configuration as that of the flash die #0. Further, here, such an example case is illustrated that the flash die #0 is of a multiplane configuration containing two planes.

The flash die #0 includes two planes (plane PLN0 and plane PLN1) and two peripheral circuits (peripheral circuit 51-0 and peripheral circuit 51-1) corresponding to the two planes (plane PLN0 and plane PLN1), respectively.

Each of the plane PLN0 and the plane PLN1 includes a memory cell array. Each of the memory cell arrays of the plane PLN0 and the plane PLN1 includes blocks BLK0 to BLKx-1. Each of the blocks BLK0 to BLKx-1 is a unit of data erase operation. Each of the blocks BLK0 to BLKx-1 may as well be referred to as an erase block, flash block or memory block. Each of the blocks BLK0 to BLKx-1 includes pages P0 to Py-1. Each of the pages P0 to Py-1 is a unit of data write operation and data read operation. Each of the pages P0 to Py-1 includes a plurality of memory cells connected to the same word line, for example.

Each of the peripheral circuits 51-0 and 51-1 is a circuit that controls the memory cell array of the corresponding plane. The peripheral circuit 51-0 includes a page buffer 511-0. The page buffer 511-0 is a buffer for temporarily storing data to be written to the memory cell array of plane PLN0 or data read from the memory cell array of plane PLN0. Similarly, the peripheral circuit 51-1 as well includes a page buffer 511-1. The page buffer 511-1 is a buffer for temporarily storing data to be written to the memory cell array of plane PLN1 or data read from the memory cell array of plane PLN1.

Figure 3:
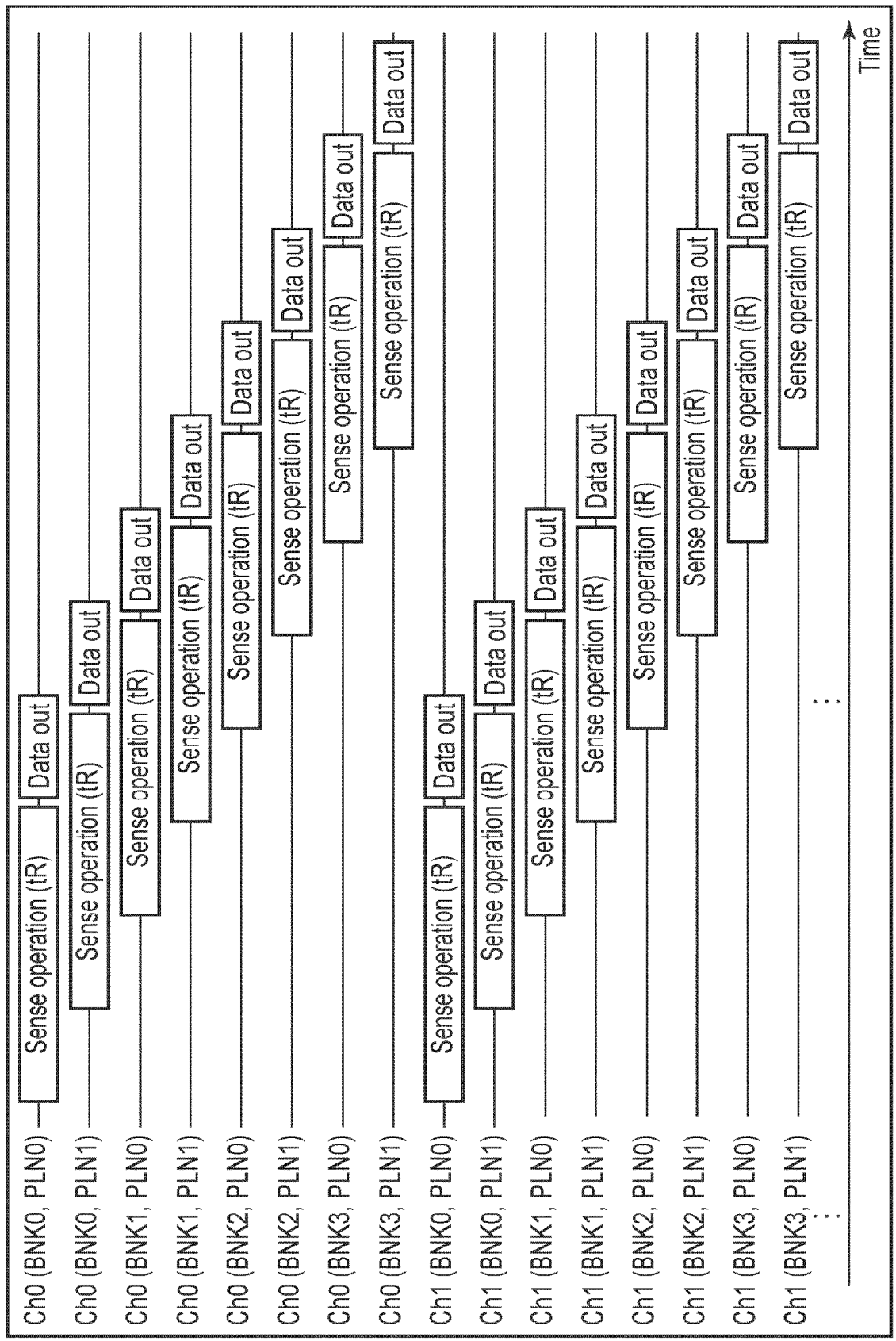
FIG. 3 is a timing chart illustrating a process for reading data in parallel from the plurality of dies of the memory system according to the embodiment.

Next, the parallel read operation will be explained. FIG. 3 is a timing chart illustrating a process for reading data in parallel from a plurality of flash dies.

The data read operation from each flash die includes a sense operation and a data output operation (Data out). The sense operation is an operation of reading data from the memory cell array to the page buffer. The data out operation is an operation of transferring data from the page buffer to the controller 4 via a channel CH. In each flash die, the sense operation in the plane PLN0 can be executed simultaneously with the sense operation in the plane PLN1. However, since the plane PLN0 and the plane PLN1 of each flash die share the same channel, the data output operation that transfers data from the page buffer of the plane PLN0 to the controller 4 and the data output operation that transfers data from the page buffer of the plane PLN1 to the controller 4 cannot be executed simultaneously. Similarly, banks BNK0 to BNK3 can operate independently with respect to each other, but they cannot transfer data via the same channel simultaneously. On the other hand, as shown in FIG. 1, the channels CH1 to CH7 are independent from each other, and therefore data transfer via the channels CH1 to CH7 can be executed simultaneously.

Therefore, in the SSD 3, as shown in FIG. 3, reading of data from a total of eight planes sharing the channel ch0, that is, (BNK0, PLN0), (BNK0, PLN1), (BNK1, PLN0), (BNK1, PLN1), (BNK2, PLN0), (BNK2, PLN1), (BNK3, PLN0) and (BNK3, PLN1) are executed in parallel so that data transfers from these eight planes are executed in a time-division manner via the channel ch0.

Similarly, reading of data from a total of eight planes that share the channel ch1, that is, (BNK0, PLN0), (BNK0, PLN1), (BNK1, PLN0), (BNK1, PLN1), (BNK2, PLN0), (BNK2, PLN1), (BNK3, PLN0) and (BNK3, PLN1) are executed in parallel so that data transfers from these eight planes are executed in a time-division manner via the channel ch1.

Next, an outline of the read process will be described. FIG. 4 is a block diagram illustrating an example of the relationship between the host read command pool, a plurality of flash command queues, a plurality of dies, a plurality of channels and a read buffer.

Host read commands received from the host 2 are accumulated in the host read command pool 421. The controller 4 executes the following process for each host read command accumulated in the host read command pool 421.

The controller 4 acquires the physical address corresponding to the logical address specified by the host read command from the L2P table 61. The controller 4 identifies the flash die in which the read target data specified by the host read command is stored, based on the acquired physical address. The controller 4 generates a read command to read the read target data. Then, the controller 4 stores the generated read command in the flash command queue corresponding to the identified flash die.

In the controller 4, flash command queues 422-0 to 422-31 associated with flash die #0 to #31, respectively, in a one-to-one relationship are provided. For example, the flash command queue 422-0 corresponding to the flash die #0 can store a plurality of read commands to read data from the flash die #0. The flash command queue 422-1 corresponding to the flash die #1 can store a plurality of read commands to read data from the flash die #1. Further, the flash command queue 422-31 corresponding to the flash die #31 can store a plurality of read commands to read data from the flash die #31.

The controller 4 transmits read commands from the flash command queues 422-0 to 422-31 to the flash dies #0 to #31, respectively. Each of the flash die #0 to #31 executes a sense operation to read data from the memory cell array to the page buffer. The read data read from each of the flash dies #0 to #31 is transferred to the controller 4 via the corresponding channel and stored in the read buffer 423. The controller 4 transfers data corresponding to the respective host read commands from the read buffer 423 to the host 2.

Now, a process for maximizing the number of parallel reads will be described here.

When the size of the read target data specified by each host read command is relatively small, a plurality of read commands are issued to different flash dies based on combinations of different host read commands. In this case, it is necessary to execute these read commands in parallel.

On the other hand, there are cases where the size of the read target data specified by one host read command is relatively large. For example, when the page size is 16 KiB, the maximum size of data read by a single read command is 16 KiB. When the number of planes per flash die is 2, the maximum size of data read by a single read command is 32 KiB. When the number of planes per flash die is 4, the maximum size of data read back by a single read command is 64 KiB.

In some cases, one host read command may be required to read a large size of read target data, such as 2 MiB. When such large-sized read target data is dispersed over different flash dies, a plurality of read commands associated with the one host read command are generated.

For example, when the number of planes per flash die is 2, the page size is 16 KiB and the size of the read target data specified by one host read command is 128 KiB, four read commands associated with the host read command may be generated. For example, when the first 32 KiB of 128-KiB read target data is stored in the flash die #0, the second 32 KiB of the 128-KiB read target data is stored in the flash die #1, the third 32 KiB of the 128-KiB read target data is stored in the flash die #2, and the fourth 32 KiB of the 128-KiB read target data is stored in the flash die #7, a first read command to read the first 32-KiB data is transmitted to the flash die #0 via a flash command queue 422-0. A second read command to read the second 32-KiB data is transmitted to flash die #1 via a flash command queue 422-1. A third read command to read the third 32-KiB data is transmitted to a flash die #2 via a flash command queue 422-7. A fourth read command to read the fourth 32-KiB data is transmitted to the flash die #7 via a flash command queue 422-7.

The busy/ready state differs from one flash die to another. Further, the data read time (tR) may differ from one flash die to another.

Therefore, when a plurality of read commands associated with the same host read command are simply transmitted to a plurality of flash dies, a plurality of data are transferred from different flash dies to the read buffer 423 in a different order from that they are transmitted to the host 2, which may be a factor that causes the size of the read buffer 423 that needs to be provided in the SSD 3 to become huge.

Therefore, in this embodiment, the controller 4 performs the following scheduling process.

The controller 4 transmits a read command to the flash die when it can be transferred to the host 2 immediately after the read is executed.

As for a plurality of read commands associated with one host read command, when all of the read command from the leading read command to the immediately preceding read command included in the plurality of read commands have already been issued to the other flash dies, respectively, the next read command subsequent to the immediately preceding read command is issued to a flash die. Thus, it is possible to transmit the plurality of read commands associated with the host read command to different flash dies respectively in the same order in which the plurality of data contained in the read target data specified by this host read command should be transferred to the host 2. As a result, basically, the plurality of data contained in the read target data can be read from different flash dies in the same order in which these data should be transferred to the host 2.

The controller 4 inhibits read commands associated with the same host read command from being simultaneously queued in the flash command queue corresponding to the same flash die. The leading read command of the plurality of read commands associated with the same host read command can be issued unconditionally when the flash die is not busy.

Further, the controller 4 performs the following read data sorting process.

The controller 4 executes the read data sorting process by controlling the timing for transferring read data from each flash die to the read buffer 423.

It is assumed here, for example, that the leading read command to read the leading data contained in the read target data specified by the same host read command is transmitted to the flash die #0, the second read command to read the second data contained in the read target data is transmitted to the flash die #1, and the third read command to read the third data contained in the read target data is transmitted to the flash die #2.

After completion of reading of the leading data to the page buffer of the flash die #0, the controller 4 reads the leading data among the read target data from the page buffer of the flash die #0. In this case, after completion of reading of the leading data to the page buffer of the flash die #0, the controller 4 allocates the first read buffer (one memory region in the read buffer 423) to the flash die #0 and transfers the leading data from the page buffer of the flash die #0 to the first read buffer.

Thus, for the leading data among the read target data, the leading data can be read from the page buffer unconditionally once the reading of the leading data to the page buffer is completed.

Then, after both the reading of the leading data to the page buffer of the flash die #0 and the reading of the second data to the page buffer of the flash die #1 are completed, the controller 4 reads the second data from the page buffer of the flash die #1. In this case, in response to completion of the reading of the second data to the page buffer of the flash die #1, the controller 4 determines whether or not the first read buffer has already been allocated to the flash die #0. When the first read buffer has already been allocated to the flash die #0, the controller 4 allocates the second read buffer (another memory region in the read buffer 423) to the flash die #1 and transfers the second data from the page buffer of the flash die #1 to the second read buffer. On the other hand, when the first read buffer is not allocated to the flash die #0, the controller 4 allocates the second read buffer to the flash die #1 after the first read buffer is allocated to the flash die #0.

Thus, the second data is read from the page buffer of flash die #1 on condition that the reading of the leading data to the page buffer is completed. When the reading of the second data to the page buffer of the flash die #1 is completed while the reading of the leading data to the page buffer of the flash die #0 has not been completed, the controller 4 does not read the second data from the page buffer of the flash die #1, and waits until the reading of the leading data to the page buffer of the flash die #0 is completed. Then, after the completion of the reading of the leading data to the page buffer of the flash die #0, the controller 4 executes a process of reading the leading data from the page buffer of the flash die #0 and a process of reading the second data from the page buffer of the flash die #1.

Then, after completion of the reading of the leading data to the page buffer of the flash die #0, the reading of the second data to the page buffer of the flash die #1, and the reading of the third data to the page buffer of the flash die #2, the controller 4 reads the third data from the page buffer of the flash die #2.

When the reading of the third data to the page buffer of the flash die #2 is completed while at least one of the reading of the leading data to the page buffer of the flash die #0 and the reading of the second data to the page buffer of the flash die #1 is not yet completed, the controller 4 does not read the third data from the page buffer of the flash die #2, but waits until both the reading of the leading data to the page buffer of the flash die #0 and the reading of the second data to the page buffer of the flash die #1 are completed.

With such a read data sorting process, even if tR is different from one flash die to another, it can be assured that the read target data specified by the host read command is transferred to the host 2 in the order of the leading data to the last data contained in the read target data.

Further, since the read buffer is allocated to each flash die in the order of the leading data to the last data, the controller 4 can start transferring data from this flash die to the read buffer as soon as the read buffer is allocated to a certain flash die. Further, as soon as the transfer of data from the flash die to the read buffer is completed, the controller 4 can start the transfer of data from this read buffer to the host 2.

Thus, the order of data transfer from the read buffers to the host 2 and the order of data transfer from the flash dies to the read buffers coincide with the order of allocation of the read buffers to the individual dies.

Next, the total capacity of the read buffer 423, which needs be provided in the SSD 3 will be explained. The total capacity of the read buffer 423 can be set so that data transfers from the flash dies on all channels to the controller 4 can be executed continuously, and data transfers to the host 2 via a bus 7 such as the PCIe bus, can as well be executed continuously. Here, if the read bandwidth of the entire flash memory 5 is sufficiently larger than the bandwidth per channel, the degradation in performance due to variations in tR for flash dies will not be noticeable. The read bandwidth of the entire flash memory 5 is expressed by the following formula.

Read Bandwidth=(1/tR)×page size×total number of dies×planes per die where 1/tR indicates the number of sense operations that can be executed per unit of time; "total number of dies" indicates the total number of flash dies in the SSD 3; "plans per die" indicates the number of planes per flash die.

The bandwidth per channel is smaller than the bandwidth of the bus 7 such as the PCIe bus. When the rate of bandwidth of the PCIe bus (PCIe bandwidth to the bandwidth per channel is 4:1, for example, at least five read buffers are provided on the SRAM 42 in order to be able to transfer read data to the host 2 using the entire bandwidth of the PCIe bus. Hereinafter, the PCIe bandwidth is also referred to as PCIeBW, and the bandwidth per channel is also referred to as BW/C.

Any four of these five read buffers are used to temporarily store read data to be transferred in parallel from the flash memory 5 to the controller 4. That is, the four read buffers are used as input buffers for the read data. Each input buffer receives, at low speed, data from the flash die being transferred at low speed and stores the received read data.

Any one of the five read buffers is used to transfer read data to the host 2 via the PCIe bus. That is, one read buffer is used as an output buffer for read data. The read data stored in the output buffer is read from the output buffer at high speed and then transferred to the memory 22 of the host 2 via the PCIe bus.

Next, a configuration example of the flash command queues 422 will be explained. FIG. 5 is a block diagram illustrating an example of a configuration of each of the plurality of flash command queues 422 in the memory system 3 of the embodiment.

The flash command queues 422 stored in the SRAM 42 include flash command queues 422-0 to 422-31 that correspond one-to-one to the flash dies #0 to #31, respectively.

For example, the flash command queue 422-0 is used to store a group of read commands to read data from the flash die #0. This is also the case for the relationship between other flash command queues and other flash dies.

Each of the flash command queues 422-0 to 422-31 includes one leading read queue, one following read queue, and one next command buffer. Each of the leading queue and the following read queue is, for example, a first-in-first-out (FIFO) queue having a depth of 1 or more. For example, the flash command queue 422-0 includes a leading read queue 4221-0, a following read queue 4222-0, and a next command buffer 4223-0. The flash command queue 422-1 includes a leading read queue 4221-1, a following read queue 4222-1, and a next command buffer 4223-1. Further, the flash command queue 422-31 includes a leading read queue 4221-31, a following read queue 4222-31, and a next command buffer 4223-31.

The leading read queues 4221-0 to 4221-31 may as well be referred to as first queues. For example, the leading read queue 4221-0 stores, of read command to read data stored in flash die #0, a single read command associated with a host read command or the leading read command of a plurality of read commands associated with a host read command.

The following read queues 4222-0 to 4222-31 may as well be referred to as second queues. For example, the following read queue 4222-0 stores, of read command to read data stored in flash die #0, any subsequent read command of the plurality of read commands associated with the host read command.

The next command buffers 4223-0 to 4223-31 may as well be referred to simply as command buffers. For example, the next command buffer 4223-0 stores a read command to be executed that is fetched from a queue selected from the leading read queue 4221-0 and the following read queue 4222-0.

The process of transmitting each of one or more read commands associated with each host read command fetched from the host 2 to one of the flash dies #0 to #31 is controlled by the scheduler 433.

First, the host read commands fetched from the submission queue (SQ) of the host 2 are stored in the host read command pool 421.

The scheduler 433 selects one host read command from the plurality of host read commands stored in the host read command pool 421. The scheduler 433 acquires the physical address associated with the logical address specified by the selected host read command from the L2P table 61. Based on the acquired physical address, the scheduler 433 identifies the flash die in which the read target data specified by the selected host read command is stored. Then, the scheduler 433 generates a single read command associated with the host read command or a leading read command of a plurality of read commands associated with the host read command. The single read command is one read command to read the read target data specified by the host read command from one flash die. The leading read command of the plurality of read commands is one read command to read leading data of the read target data specified by the host read command from one flash die.

The scheduler 433 selects the flash command queue corresponding to the identified flash die. The scheduler 433 then stores the single read command associated with the host read command or the leading read command of a plurality of read commands associated with the host read command in the leading read queue of the selected flash command queue.

When read commands are stored in both the leading read queue and the following read queue, which correspond to a certain flash die, the scheduler 433 selects the following read queue in preference to the leading read queue, fetches the read command stored in the following read queue as the read command to be executed, and stores the fetched read command to be executed in the corresponding next command buffer. By preferentially selecting the following read queue in this manner, the number of host read commands that are executed simultaneously and require to read from a plurality of different flash dies can be limited. Further, once the execution of a plurality of read commands associated with a certain host read command has started, it is possible to inhibit the start of other host read commands that require to read from a plurality of different flash dies. As a result, all of the plurality of data contained in the read target data specified by one host read command can be read from flash memory 5 within a certain short period of time, thus making it possible to prevent the read buffer 423 from being occupied for a long time with a lot of data that cannot be started to be transferred to the host 2.

Note that when the read command stored in the leading read queue is a single read command associated with one host read command, the leading read queue may be selected in priority. Thus, the processing corresponding to a single read command is completed quickly, and therefore even if a single read command is executed after the execution of a plurality of read commands associated with one host read command has once started, the time required to complete the processing of the plurality of read commands associated with the one host read command is not very long.

In response to storing a read command selected from the leading read queue or following read queue in the next command buffer, that is, in response to determining to transmit a certain read command via the command buffer to a certain flash die, the scheduler 433 determine whether or not it is necessary to issue the next read command subsequent to the read command to be executed that is stored in the next command buffer, that is, whether or not it is necessary to read the data subsequent to the data that is requested to be read by the read command to be executed.

When the next read command needs to be issued, the scheduler 433 generates the next read command. At this time, the scheduler 433 refers to the L2P table 61 and identifies the flash die that stores data subsequent to the data requested to be read by the read command to be executed, which is stored in the next command buffer, and the length of this subsequent data stored in the identified flash die.

The scheduler 433 then executes a process of transmitting the read command to be executed, which is stored in the next command buffer, to the flash die, and a process of storing the next read command subsequent to the read command to be executed in the following read queue corresponding to the identified flash die.

For example, when the read command to be executed is a read command that is stored in the next command buffer 4223-0 corresponding to the flash die #0 and when the flash die that in which the data subsequent to the data requested to be read by the read command to be executed is stored is the flash die #1, the scheduler 43 3 identifies the flash die #1 in which this subsequent data is stored and the length of this subsequent data stored in the flash die #1 in the stage of the next command buffer 4223-0 corresponding to the flash die #0. Then, the scheduler 433 generates the next read command to read this subsequent data from the flash die #1. The scheduler 433 then executes a process of transmitting the read command to be executed to the flash die #0 and a process of storing the generated next read command in the following read queue 422-1 corresponding to the flash die

1. In this case, after transmitting the read command to be executed to the flash die #0, the generated next read command may be stored in the following read queue 4222-1 corresponding to the flash die #1. Alternatively, after the generated next read command is stored in the following read queue 4222-1 corresponding to the flash die #1, the read command to be executed may be transmitted to the flash die #0. In the process of storing the generated next read command in the following read queue 4222-1 corresponding to the flash die #1, for example, the scheduler 433, first, prepares the generated next read command in the next command buffer 4223-0 corresponding to the flash die #0, and then may transfer the generated next read command from the next command buffer 4223-0 to the following read queue 4222-1 corresponding to the flash die #1.

When a read command is stored in following read queue 4222-1, the scheduler 433 selects the following read queue 4222-1 and stores the read command stored in the following read queue 4222-1 in the next command buffer 4223-1 as the read command to be executed. In this case as well, the scheduler 433 determines whether or not the next read command subsequent to the read command to be executed, stored in the next command buffer 4223-1 needs to be issued.

When the next read command subsequent to the read command to be executed, stored in the next command buffer 4223-1 needs to be issued, the scheduler 433 generates the next read command. At this time, the scheduler 433 refers to the L2P table 61 and identifies the flash die that stores the data subsequent to the data requested to be read by the read command to be executed, stored in the next command buffer 4223-1, and the length of the subsequent data stored in the identified flash die.

Then, the scheduler 433 executes a process of sending the read command to be executed, stored in the next command buffer to the flash die #1 and a process of storing the subsequent next read command in the following read queue corresponding to the identified flash die.

For example, when the flash die that stores the data subsequent to the data requested to be read by the read command to be executed, stored in the next command buffer 4223-1 is the flash die #31, the scheduler 433 identifies the flash die #31 in which the subsequent data is stored and the length of the subsequent data stored in the flash die #31 in the stage of the next command buffer 4223-1 corresponding to the flash die #1. The scheduler 433 generates the next read command to read the subsequent data from the flash die #31. The scheduler 433 then executes a process of transmitting the read command to be executed to the flash die #1 and a process of storing the generated next read command in the following read queue 4222-31 corresponding to the flash die #31. In this case, after transmitting the read command to be executed to the flash die #1, the next read command generated may be stored in the following read queue 4222-31 corresponding to the flash die #31. Alternatively, the read command to be executed may be transmitted to the flash die #1 after the generated next read command is stored in the following read queue 4222-31 corresponding to the flash die #31. In the process of storing the generated next read command in the following read queue 4222-31 corresponding to the flash die #31, for example, the scheduler 433, first, prepares the generated next read command in the next command buffer 4223-1 corresponding to the flash die #1, and then may be transfer the generated next read command from the next command buffer 4223-1 to the following read queue 4222-31 corresponding to the flash die #31.

The read command stored in one next command buffer is transmitted to the flash die corresponding to this next command buffer after the state of the flash die corresponding to this next command buffer transitions from a busy state to a ready state. Based on the received read command, the flash die executes a sense operation to read data from the memory cell array to the page buffer.

When the data read to the page buffer of a certain flash die is the leading data of the read target data corresponding to the host read command, the read data transfer control unit 434 transfers this data to the read buffer 423 in response to the data being read to the page buffer. Further, when the data read to the page buffer of a certain flash die is data other than the leading data of the read target data corresponding to the host read command, the read data transfer control unit 434 starts a process of transferring the data read to the page buffer of the flash die to the read buffer 423 after the data preceding this data has been read to the page buffer.

The read data transfer control unit 434 then reads the data from the read buffer 423 and transfers the read data to the host 2 via the PCIe bus.

Next, the read process will be described. FIG. 6 is a diagram illustrating an example of the read process executed in the memory system of the embodiment. FIG. 6 illustrates an example case where the read target data specified by the host read command is dispersed over three flash dies.

The host read command received from the host 2 is stored in the host read command pool 421. It is assumed here that the stored host read command specifies LBA0 as the start LBA and also 10 as the data length (data size). The data length=10, indicates that the size of the read target data is the size corresponding to ten LBAs. The page size is, for example, 16 KiB, and the size corresponding to one LBA is, for example, 4 KiB. Each page contains four 4-KiB regions corresponding to four offsets 0 to 3.

First, the scheduler 433 refers to the L2P table 61 to identify the flash die in which the leading data among the read target data specified by the host read command is stored and the length (size) of the leading data stored in this flash die.

Here, such a case as shown in FIG. 6 is assumed that 16-KiB data (D1 to D4) corresponding to LBA0 to LBA3 are stored in page P0 of block BLK0 of flash die #i, 16-KiB data (D5 to D8) corresponding to LBA4 to LBA7 in page P0 of block BLK100 of flash die #j, and 8-KiB data (D9 to D10) corresponding to LBA8 to LBA9 are stored on page P0 of block BLK200 of flash die #k.

In this case, since the four physical addresses corresponding respectively to the four LBAs (LBA0 to 3) acquired from the L2P table 61 are four consecutive physical addresses in the flash die #i, the scheduler 433 identifies the flash die #i as the flash die in which the leading data among the read target data is stored. Further, the scheduler 433 identifies the length corresponding to the four LBAs (=16 KiB) as the length of the leading data stored in the flash die #i. The scheduler 433 generates read command CMD0-1 to read 16-KiB data (D1 to D3) from the page P0 of the block BLK0 of the flash die #i, and stores the read command CMD0-1 in the leading read queue 4221-I corresponding to the flash die #i. Here, no read command is stored in the following read queue 4221-i, the scheduler 433 selects the leading read queue 4221-i and stores the read command CMD0-1 stored in the leading read queue 4221-i in the next command buffer 4223-i.

In response to the read command CMD0-1 being stored in the next command buffer 4223-i, the scheduler 433 determines whether or not the next read command subsequent to the read command CMD0-1 needs to be issued. This determination may be executed, for example, based on the additional information added to this read command CMD0-1.

The read command CMD0-1 is the leading read command of a plurality of read commands associated with one host read command and is not the last read command of the plurality of read commands. Therefore, the scheduler 433 determines that the next read command subsequent to the read command CMD0-1 needs to be issued.

In response to determining that the next read command needs to be issued, the scheduler 433 refers to the L2P table 61 to identify the flash die that stores the second data subsequent to the leading data and the length of the second data stored in this flash die. Since the four physical addresses corresponding respectively to the four LBAs (LBA4 to 7) acquired from the L2P table 61 are four consecutive physical addresses in the flash die #j, the scheduler 433 identifies the flash die #j as the flash die in which the second data is stored. Further, the scheduler 433 identifies the length corresponding to the four LBAs (=16 KiB) as the length of the second data stored in the flash die #j. The scheduler 433 generates read command CMD0-2 to read 16-KiB data (D5 to D7) from page P0 of block BLK100 of the flash die #j.

The scheduler 433 then executes a process of transmitting the read command CMD0-1 to the flash die #i and a process of storing the read command CMD0-2 in the following read queue 422-j corresponding to the flash die #j.

Once the read command CMD0-2 is stored in the following read queue 4222-j, the scheduler 433 selects the following read queue 4222-j with priority over the leading read queue 4221-j and thus stores the read command CMD0-2 in the next command buffer 4223-j corresponding to the flash die #j.

In response to the read command CMD0-2 being stored in the next command buffer 4223-j, the scheduler 433 determines whether or not the next read command subsequent to the read command CMD0-2 needs to be issued. This determination may be executed, for example, based on the additional information added to this read command CMD0-2.

The read command CMD0-2 is the second read command of the plurality of read commands associated with the one host read command and is not the last read command of the plurality of read commands. Therefore, the scheduler 433 determines that the next read command subsequent to the read command CMD0-2 needs to be issued.

In response to determining that the next read command needs to be issued, the scheduler 433 refers to the L2P table 61 to identify the flash die that stores the third data subsequent to the second data and the length of the third data stored in this flash die. Since the two physical addresses corresponding respectively to the two LBAs (LBA8 to 9) acquired from the L2P table 61 are two consecutive physical addresses in the flash die #k, the scheduler 433 identifies the flash die #k as the flash die in which the third data is stored. Further, the scheduler 433 identifies the length corresponding to the two LBAs (=8 KiB) as the length of the third data stored in the flash die #k. The scheduler 433 generates read command CMD0-3 to read 8-KiB data (D9 to D10) from page P0 of block BLK200 of the flash die #k.

The scheduler 433 then executes a process of transmitting the read command CMD0-2 to the flash die #j and a process of storing the read command CMD0-3 in the following read queue 4222-k corresponding to the flash die #k.

Once the read command CMD0-3 is stored in the following read queue 4222-k, the scheduler 433 selects the following read queue 4222-k with priority over the leading read queue 4221-k, and thus stores the read command CMD0-3 in the next command buffer 4223-k corresponding to the flash die #k.

In response to the read command CMD0-3 being stored in the next command buffer 4223-k, the scheduler 433 determines whether or not the next read command subsequent to the read command CMD0-3 needs to be issued. This determination may be executed, for example, based on the additional information added to this read command CMD0-3.

The read command CMD0-3 is the last read command of the plurality of read commands associated with the one host read command. Therefore, the scheduler 433 determines that the next read command subsequent to the read command CMD0-3 need not to be issued.

The scheduler 433 executes the process of transmitting the read command CMD0-3 to the flash die #k.

With the above-described processes, the three read commands CMD-1, CMD-2 and CMD-3 corresponding to the read target data of the host read command are transmitted to flash dies #i, #j and #k, respectively, in the order of CMD-1, CMD-2 and CMD-3.

Next, the timing for executing PRP/SGL decoding will be described. FIG. 7 is a diagram illustrating an example of a procedure of a read process executed in the memory system of the embodiment.

First, the controller 4 fetches the host read command from the submission queue SQ of the host 2 by the command fetch process (step S1). The controller 4 stores the host read command fetched in step S1 in the host read command pool 421.

The controller 4 refers to the L2P table 61 to generate the leading read command (flash read command) associated with the host read command (step S2). The controller 4 refers to the L2P table 61 to acquire a physical address indicating the storage location where the leading data included in the read target data specified by the host read command is stored. Based on the acquired physical address, the controller 4 generates the leading read command. In this case, the controller 4 acquires the physical address associated with the start LBA specified by the host read command from the L2P table 61 and identifies the flash die in which the leading data is stored based on the acquired physical address. The controller 4 stores the generated read command in the flash command queue 422 corresponding to the identified flash die.

The controller 4 executes the PRP/SGL decoding to calculate an address indicating the memory location on the host read buffer 221 of the host 2 to which the data corresponding to the read command stored in the flash command queue 422 is to be transferred (step S3).

When the next read command subsequent to the generated read command needs to be issued, the controller 4 repeats the process of step S2 and the process of step S3 until the last read command associated with the host read command is generated.

The controller 4 issues the generated read command to the identified flash die (step S4). The flash die that receives the read command executes a sense operation to read data from the page, which includes the storage location indicated by the physical address specified by the read command, to the page buffer 511.

After reading of the data to the page buffer 511 is completed, the controller 4 allocates the read buffer RB to the identified flash die (step S5). The read buffer RB allocated to the identified flash die is one storage region in the read buffer 423.

The controller 4 transfers the data stored in the page buffer 511 to the read buffer RB allocated in step S5 (step S6).

Then, the controller 4 transfers data from the read buffer RB to the memory region on the host read buffer 221 based on the address acquired in step S3 (step S7). In step S7, the data having the length identified in step S2 is transferred from the read buffer RB to the memory region on the host read buffer 221.

Thus, in this embodiment, when it is necessary to generate a plurality of read commands associated with the host read command, the process of identifying a plurality of flash dies to be read is not executed at once, but rather the plurality of flash dies to be read are identified in a time-division manner so that the plurality of flash dies to be read are identified sequentially in the order of the leading data to the last data included the read target data.

Further, in this embodiment, as described in FIG. 7, the process in step S3 to calculate the plurality of addresses on the host read buffer 221 of the host 2 to which the plurality of data included in the read target data should be transferred is also executed in a time-division manner rather than calculating a plurality of addresses at once. Therefore, as compared to the case of calculating a plurality of addresses at once, the amount of results of the PRP/SGL decoding, which need to be stored simultaneously, that is, the number of calculated addresses can be reduced. In this manner, it is possible to reduce the amount of memory resources that need to be provided in the SSD 3 to store the results of the PRP/SGL decoding.

Next, the order of receiving read data in the read buffer 423 and the order of transferring read data from the read buffer 423 to the host read buffer 221 will be described. FIG. 8 is a timing chart illustrating an example of the order of receiving read data in the read buffer provided in the memory system of the embodiment and an example of the order of transferring read data from the read buffer to the host.

The horizontal axis in FIG. 8 indicates time. The upper portion of FIG. 8 shows the data to be received by the read buffer 423 and the time required for the data receiving process. The lower portion of FIG. 8 shows the data being transferred from the read buffer 423 to the host 2 and the time required for the data transfer process. Further, here, it is assumed that the ratio of the bandwidth of the PCIe bus (PCIeBW) to the bandwidth per channel (BW/C) is 4:1, and five read buffers RB #1 to RB #5 are provided on the SRAM 42. Any four read buffers of the five read buffers RB #1 to RB #5 are used simultaneously for the process of receiving read data which is read from the flash dies via the channels. Further, any one of the five read buffers RB #1 to RB #5 is used to transfer the read data stored in the read buffer to the host 2 via the PCIe bus.

First, at time T1, the receiving process for the read data corresponding to read command CMD0 Part0 is started. The read data corresponding to the read command CMD0 Part0 is the leading data among the read target data specified by the host read command CMD0. The read data corresponding to the read command CMD0 Part0 is read from the page buffer of the flash die to which the read command CMD0 Part0 was issued. The read data corresponding to the read command CMD0 Part0 is then transferred from the page buffer to the read buffer RB #1 at a lower speed corresponding to the bandwidth per channel (BW/C) and stored in the read buffer RB #1. The receiving process for read data corresponding to the read command CMD0 Part0 is executed from time T1 over to time T5.

Next, at time T2, the receiving process for the read data corresponding to read command CMD1 Part0 is started. The read data corresponding to the read command CMD1 Part0 is the leading data among the read target data specified by the host read command CMD1. The read data corresponding to the read command CMD1 Part0 is read from the page buffer of the flash die to which the read command CMD1 Part0 was issued. The read data corresponding to read command CMD1 Part0 is transferred from the page buffer to the read buffer RB #2 at a low speed corresponding to the bandwidth per channel (BW/C) and stored in the read buffer RB #2. The receiving process of read data corresponding to the read command CMD1 Part0 is executed from time T2 over to time T6.

Next, at time T3, the receiving process for the read data corresponding to read command CMD0 Part1 is started. The read data corresponding to read command CMD0 Part1 is the second data among the read target data specified by the host read command CMD0. The read data corresponding to read command CMD0 Part1 is read from the page buffer of the flash die to which the read command CMD0 Part1 was issued. The read data corresponding to the read command CMD0 Part1 is transferred from the page buffer to the read buffer RB #3 at a low speed corresponding to the bandwidth per channel (BW/C) and stored in the read buffer RB #3. The receiving process of read data corresponding to the read command CMD0 Part1 is executed 3 over to time T7.

Next, at time T4, the receiving process for the read data corresponding to read command CMD0 Part2 is started. The read data corresponding to the read command CMD0 Part2 is the third data among the read target data specified by the host read command CMD0. The read data corresponding to the read command CMD0 Part2 is read from the page buffer of the flash die to which the read command CMD0 Part2 was issued. The read data corresponding to the read command CMD0 Part2 is transferred from the page buffer to the read buffer RB #4 at a low speed corresponding to the bandwidth per channel (BW/C) and stored in the read buffer RB #4. The receiving process for the read data corresponding to the read command CMD0 Part2 is executed 4 over to time T8.

Next, at time T5, the receiving process for the read data corresponding to read command CMD0 Part0 is completed. Accordingly, the transfer process to transfer the read data corresponding to the read command CMD0 Part0 stored in the read buffer RB #1 to the host 2 is started. The transfer process of the read data corresponding to the read command CMD0 Part0 is executed from time T5 over to time T6 at a speed four times faster than the speed of the receiving process.

At time T5, the receive processing for the read data corresponding to read command CMD2 Part0 is started. The read data corresponding to the read command CMD2 Part0 is the leading data among the read target data specified by the host read command CMD2. The read data corresponding to the read command CMD2 Part0 is read from the page buffer of the flash die to which the read command CMD2 Part0 was issued. This flash die is, for example, the flash die connected to the same channel as that of the flash die to which the read command CMD0 Part0 was issued. The read data corresponding to the read command CMD2 Part0 is transferred from the page buffer to the read buffer RB #5 at a low speed corresponding to the bandwidth per channel (BW/C) and stored in the read buffer RB #5. The receiving process for the read data corresponding to the read command CMD2 Part 0 is executed from time T5 over to time T9.

Next, at time T6, the receiving process of the read data corresponding to the read command CMD1 Part0 is completed, and the transfer process of transferring the read data corresponding to the read command CMD0 Part0 to the host 2 is also completed. Accordingly, the transfer process of transferring the read data corresponding to the read command CMD1 Part0 stored in the read buffer RB #2 to the host 2 is started. The transfer process of transferring the read data corresponding to the read command CMD1 Part0 is executed from time T6 over to time T7 at a speed four times faster than the speed of the receiving process. Further, at time T6, the transfer process of transferring the read data corresponding to the read command CMD0 Part0 to the host 2 is completed, and therefore the read buffer RB #1 is made available for the receiving process of new read data.

Then, at time T6, the receiving process for the read data corresponding to read command CMD0 Part3 is started. The read data corresponding to the read command CMD0 Part3 is the fourth data among the read target data specified by the host read command CMD0. The read data corresponding to the read command CMD0 Part3 is read from the page buffer of the flash die to which the read command CMD0 Part3 was issued. This flash die is, for example, a flash die connected to the same channel as that of the flash die to which the read command CMD1 Part0 was issued. The read data corresponding to the read command CMD0 Part3 is transferred from the page buffer to the read buffer RB #1 at a low speed corresponding to the bandwidth per channel (BW/C) and stored in the read buffer RB #1. The receiving process for the read data corresponding to the read command CMD0 Part3 is executed from time T6 over to time T10.

Next, at time T7, the receiving process corresponding to the read command CMD1 Part1 is completed and the transfer process of the read data corresponding to the read command CMD1 Part0 is also completed. Accordingly, the transfer process of transferring the read data corresponding to the read command CMD0 Part1 stored in the read buffer RB #3 to the host 2 is started. The transfer process of the read data corresponding to the read command CMD0 Part1 is executed from time T7 to time T8 at a speed four times faster than the speed of the receiving process. Here, since the transfer process for the read data corresponding to the read command CMD1 Part0 is completed, the read buffer RB #2 is made available for the receiving process of new read data.

Then, at time T7, the receiving process for the read data corresponding to the read command CMD2 Part1 is started. The read data corresponding to the read command CMD2 Part1 is the second data among the read target data specified by the host read command CMD2. The read data corresponding to the read command CMD2 Part1 is read from the page buffer of the flash die to which the read command CMD2 Part1 was issued. This flash die is, for example, a flash die connected to the same channel as that of the flash die to which the read command CMD0 Part1 was issued. The read data corresponding to the read command CMD2 Part1 is transferred from the page buffer to the read buffer RB #2 at a low speed corresponding to the bandwidth per channel (BW/C) and stored in the read buffer RB #2. The receiving process for the read data corresponding to the read command CMD2 Part1 is executed from time T7 over to time T11.

Next, at time T8, the receiving process for the read data corresponding to the read command CMD0 Part2 is completed, and the transfer process of transferring the read data corresponding to the read command CMD0 Part1 to the host 2 is also completed. Accordingly, the transfer process of transferring the read data corresponding to the read command CMD0 Part2 stored in the read buffer RB #4 to the host 2 is started. The transfer process for the read data corresponding to the read command CMD0 Part2 is executed from time T8 over to time T9 at a speed four times faster than the speed of the receiving process. Here, since the transfer process for the read data corresponding to the read command CMD0 Part1 is completed, the read buffer RB #3 is made available for the receiving process of new read data.

Then, at time T8, the receiving process for the read data corresponding to read command CMD0 Part4 is started. The read data corresponding to the read command CMD0 Part4 is the fifth data among the read target data specified by the host read command CMD0. The read data corresponding to the read command CMD0 Part4 is read from the page buffer of the flash die to which the read command CMD0 Part4 was issued. This flash die is, for example, a flash die connected to the same channel as that of the flash die to which the read command CMD0 Part2 was issued. The read data corresponding to the read command CMD0 Part4 is transferred from the page buffer to the read buffer RB #2 at a low speed corresponding to the bandwidth per channel (BW/C), and stored in the read buffer RB #2. The receiving process for the read data corresponding to the read command CMD0 Part4 is executed from time T8 over to time T12.

Figure 9:
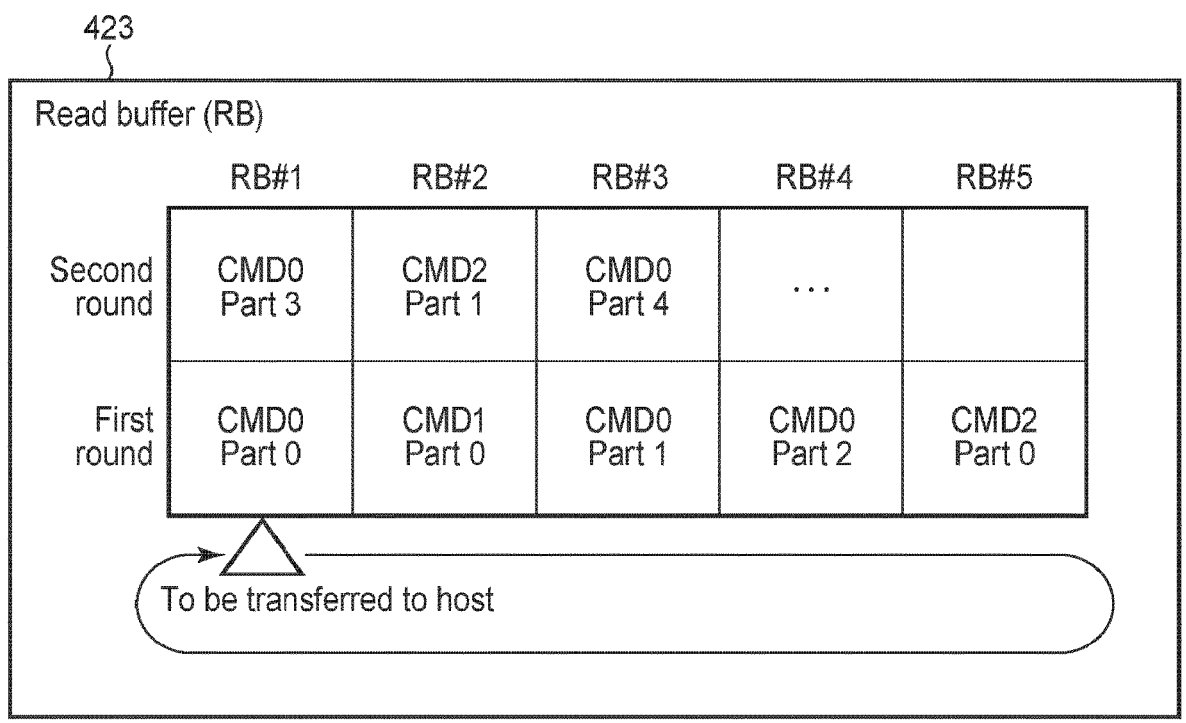
FIG. 9 is a diagram illustrating an example of read data held in the read buffer in the first round and an example of read data held in the read buffer in the second round.

Next, the data stored in each storage area of the read buffer will be described. FIG. 9 is a diagram illustrating an example of read data held in the read buffer in the first round and an example of read data held in the read buffer in the second round.

As explained from time T1 to time T6 in FIG. 8, in the first round, the read data corresponding to the read command CMD0 Part0 is stored in the read buffer RB #1, the read data corresponding to the read command CMD1 Part0 is stored in the read buffer RB #2, the read data corresponding to the read command CMD0 Part1 is stored in the read buffer RB #3, the read data corresponding to the read command CMD0 Part2 is stored in the read buffer RB #4, and the read data corresponding to the read command CMD2 Part0 is stored in the read buffer RB #5.

Then, in response to completion of the transfer process of transferring, to the host 2, the read data corresponding to the read command CMD0 Part0 stored in the first round, the data corresponding to the read command CMD0 Part3 is stored in the read buffer RB #1 as the data of the second round. Then, in response to completion of the transfer process of transferring, to the host 2, the read data corresponding to the read command CMD1 Part0 stored in the first round, the read data corresponding to the read command CMD2 Part1 is stored in the read buffer RB #2 as the data of the second round. In response to completion of the transfer process of transferring, to the host 2, the read data corresponding to the read command CMD0 Part1 stored in the first round, the read data corresponding to the read command CMD0 Part4 is stored in the read buffer RB #3 as the data of the second round.

Figure 10:
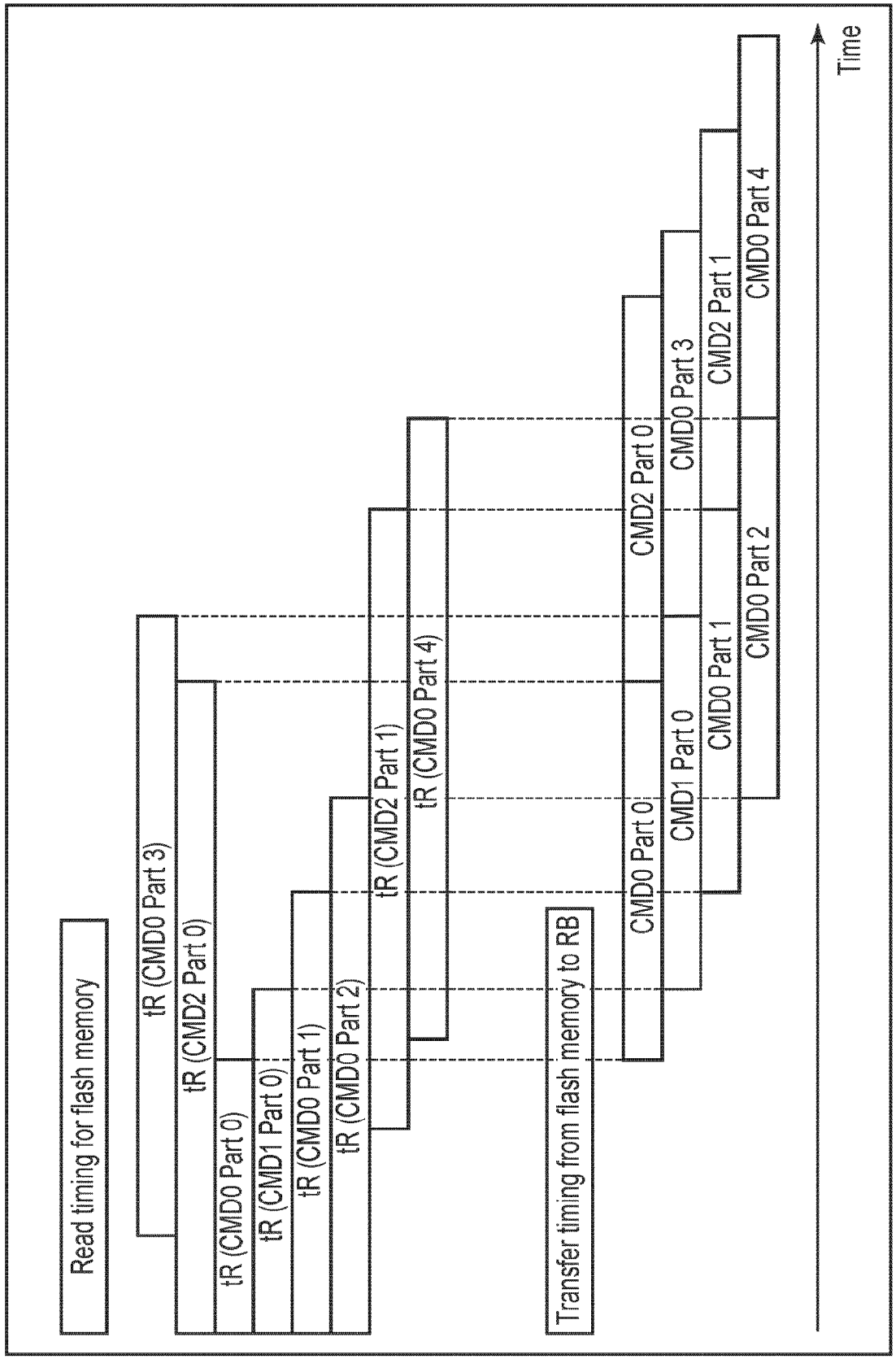
FIG. 10 is a timing chart illustrating an example of read timing of the nonvolatile memory and an example of transfer timing from the nonvolatile memory to the read buffer.

Next, the timing for the read process in the flash memory will be explained. FIG. 10 is a timing chart illustrating an example of read timing of flash memory and an example of transfer timing from the flash memory to the read buffer.

The horizontal axis in FIG. 10 indicates time. The upper portion of FIG. 10 shows the timing for executing the read operation based on each read command. The lower portion of FIG. 10 shows the timing for transferring data corresponding to each read command from the flash die to the read buffer 423.

When the ratio of the bandwidth of the PCIe bus (PCIeBW) to the bandwidth per channel (BW/C) is 4:1, it is preferable to transfer the read data corresponding to four read commands from the flash memory 5 to the read buffer 423 in parallel, as shown in the lower part of FIG. 10, in order to improve the throughput of the read process. In a case where the time tR required for a read operation (sense operation) in the flash die is longer than the time required for the transfer operation to the read buffer 423, it is possible to improve the throughput of the read process by executing the read operations based on a plurality of read commands in parallel.

In the case shown in FIG. 10, the read operations based on at a maximum of seven read commands are executed in parallel.

Figure 11:
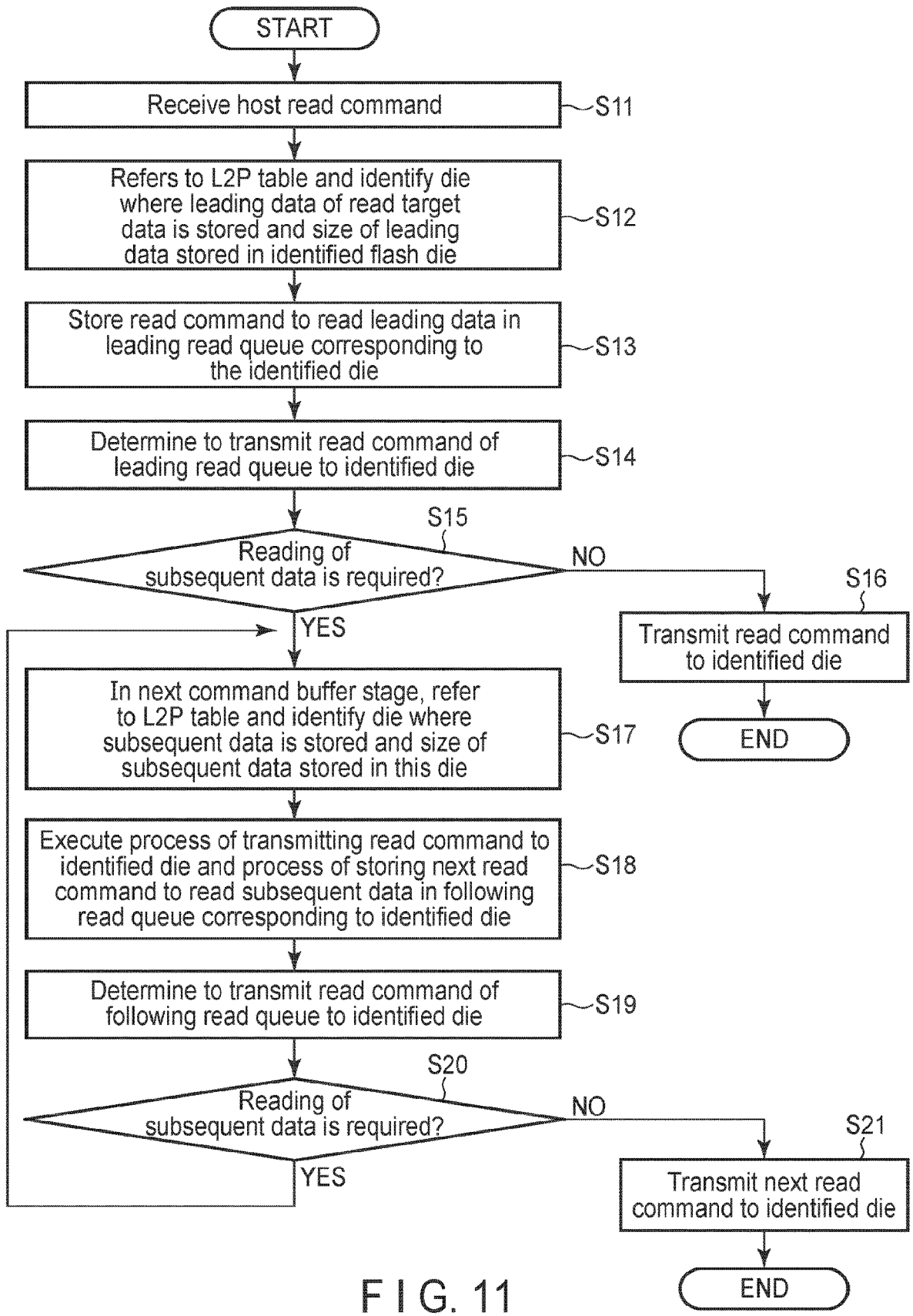
FIG. 11 is a flowchart illustrating a procedure of a read process executed in the memory system according to the embodiment.

Next, the procedure of the read process will be described. FIG. 11 is a flowchart illustrating a procedure of a read process executed in the memory system of the embodiment.

First, the controller 4 receives a host read command from the host 2 (step S11). The received host read command is stored in the host read command pool 421.

The controller 4 refers to the L2P table 61 to identify the flash die in which the leading data of the read target data of the host read command received in step S11 is stored and the size (length) of the data stored in the identified flash die (step S12).

The controller 4 generates a read command to read the leading data and stores the generated read command in the leading read queue corresponding to the flash die identified in step S12 (step S13).

The controller 4 determines to transmit the read command stored in the leading read queue in step S13 to the flash die identified in step S12 (step S14). In this case, the read command determined to be transmitted to the flash die is stored in the next command buffer as the read command to be executed.

The controller 4 determines whether or not data subsequent to the leading data corresponding to the read command determined to be transmitted to the flash die in step S14 needs to be read, that is, whether or not the next read command subsequent to the read command to be executed needs to be issued (step S15). This determination is executed based on whether the read command to be executed is any other read command except for the single read command associated with the host read command and the last read command of the plurality of read commands associated with the host read command.

When the subsequent data need not be read, that is when the next read command need not be issued (No in step S15), the controller 4 transmits the read command determined in step S14 (the read command to be executed) to the flash die (step S16) and ends the read process.

When the subsequent data needs to be read, that is, when the next read command needs to be issued (Yes in step S15), the controller 4 refers to the L2P table 61 in the stage of the next command buffer in which the read command determined in step S14 (the read command to be executed) is stored, and identifies the flash die in which the subsequent data is stored and the size (length) of the subsequent data stored in this flash die (step S17). The subsequent data is data subsequent to the data that is requested to be read by the read command to be executed. In step S17, the controller 4 generates the next read command to read the subsequent data from the flash die identified in step S17.

The controller 4 executes a process of transmitting the read command determined in step S14 (read command to be executed) stored in the next command buffer to the flash die identified in step S12, and a process of storing the generated next read command in the following read queue corresponding to the flash die identified in step S17 (step S18).

The controller 4 selects the following read queue corresponding to the flash die identified in step S17, with priority over the leading read queue corresponding to the flash die identified in step S17. Therefore, the controller 4 determines to transmit the next read command stored in the following read queue in step S18 to the flash die identified in step S17 (step S19). The read command determined to be transmitted to the flash die is stored, as a read command to be executed, in the next command buffer corresponding to the flash die identified in step S17.

The controller 4 determines whether or not data subsequent to the data corresponding to the read command determined to be transmitted in step S19 need to be read, that is, whether or not the next read command subsequent to the read command to be executed, stored in the next command buffer corresponding to the flash die identified in step S17 need to be issued (step S20).

When no subsequent data need to be read, that is, when the next read command need not be issued (No in step S20), the controller 4 transmits the read command determined in step S19 (read command to be executed) to the flash die identified in step S17 (step S21) and ends the read process.

When the subsequent data needs to be read, that is, when the next read command needs to be issued (Yes in step S20), the controller 4 re-executes the process of the steps S17 to S19. Note here that the "read command determined in step S14" in the previous description corresponds to the "read command determined in step S19".

In this manner, when a certain read command is stored in the next command buffer corresponding to a certain flash die #m as a read command to be executed, the controller 4 determines whether or not it is necessary to issue the next read command subsequent to the read command to be executed. Then, in response to determining that the next read command needs to be issued, the controller 4 identifies the flash die #n in which the data subsequent to the data requested to be read by the read command to be executed is stored, and the length of the subsequent data stored in this flash die #n. Then, the controller 4 generates the next read command to read the subsequent data, and executes a process of transmitting the read command to be executed to the flash die #m, and a process of storing the generated next read command in the following read queue corresponding to the flash die #n.

Next, the process executed at the time of completion of a read out in the nonvolatile memory will be described. FIG. 12 is a flowchart illustrating a procedure of a process which is executed at the time of completion of reading from the nonvolatile memory in the memory system of the embodiment.

First, in response to the completion of reading of data to the page buffer 511 of a certain flash die (start), the controller 4 determines whether or not the data which is read to the page buffer 511 is data corresponding to the next read order (step S31). For example, it is assumed here that the first read command to read the leading data of the read target data specified by a certain host read command and the second read command to read the data subsequent to the leading data are transmitted to different flash dies in the order of the first read command, and the second read command. In this case, when the reading of the data corresponding to the first read command to the page buffer 511 has not yet been completed, the data corresponding to the next read order is the data corresponding to the first read command. When the reading of the data corresponding to the first read command to the page buffer 511 has already been completed, the data corresponding to the next read order is the data corresponding to the second read command.

When the data read to the page buffer 511 is not the data corresponding to the next read order (No in step S31), the data read to the page buffer 511 does not satisfy the read enable condition. Therefore, the controller 4 maintains the data in the page buffer 511 (step S32) and ends this process. In other words, the controller 4 ends this process without reading data from the page buffer 511.

When the data read to the page buffer 511 is the data corresponding to the next reading order (Yes in step S31), the data read to the page buffer 511 satisfies the read enable condition. Therefore, the controller 4 allocates a read buffer (one storage area in the read buffer 423) to this flash die (step S33).

The controller 4 reads data from the page buffer 511 and transfers the read data to the read buffer allocated in step S33 (step S34). The data corresponding to the next read order is changed to the next data subsequent to the data transferred to the read buffer in step S34.

The controller 4 determines whether or not the reading of the subsequent data to the page buffer 511 has been completed in a certain flash die (step S35).

When the reading of the subsequent data to the page buffer 511 has been completed (Yes in step S35), the controller 4 re-executes the process from step S31.

When the reading of the subsequent data to the page buffer 511 has not been completed (No in step S35), the controller 4 ends this process.

Figure 13:
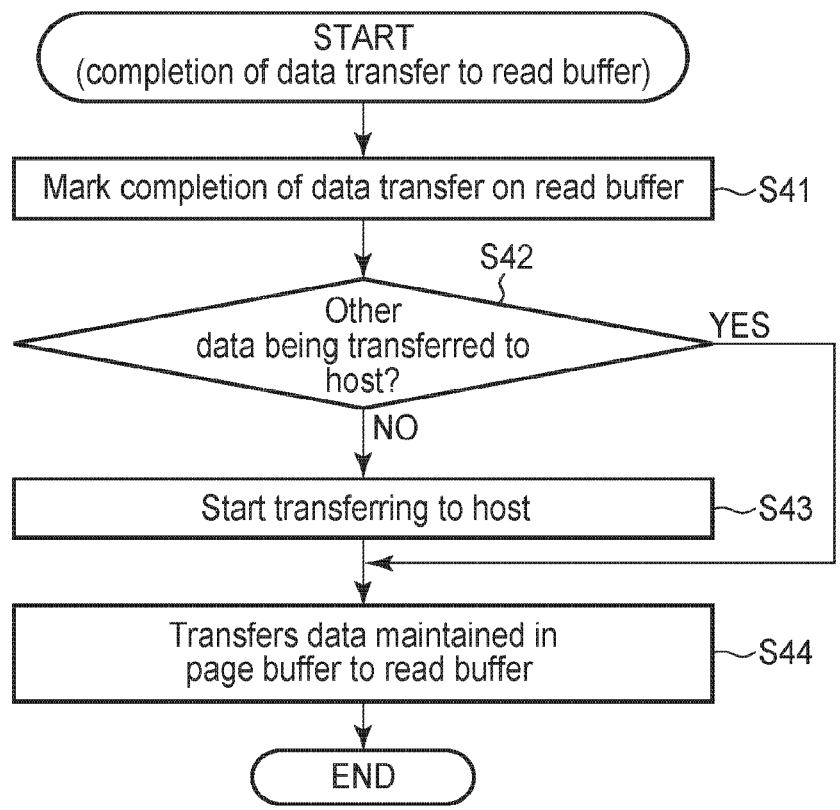
FIG. 13 is a flowchart illustrating a procedure of a process which is executed at the time of completion of data transfer to the read buffer in the memory system according to the embodiment

Next, the process to be executed at the time of completion of data transfer to the read buffer will be described. FIG. 13 is a flowchart illustrating a procedure of a process which is executed at the time of completion of data transfer to a read buffer in the memory system of the embodiment.

In response to the completion of data transfer to a certain read buffer (start), the controller 4 marks the completion of data transfer to this read buffer (step S41).

The controller 4 determines whether or not other data is being transferred to the host 2 (step S42).

When other data is not being transferred to the host 2 (No in step S42), the controller 4 starts the process of transferring the data that has been transferred to the read buffer to the memory 22 of the host 2 (step S43).

When other data is being transferred to the host 2 (Yes in step S42), the controller 4 skips the procedure of step S43.

Then, the controller 4 transfers the data maintained in the page buffer in a certain flash die (data maintained in the page buffer in step S32 in FIG. 12) to the read buffer allocated to this flash die (step S44), and ends this process. This is because at the time when the step S44 is executed, the data maintained in the page buffer in step S32 in FIG. 12 satisfies the read enable condition. In other words, when the data that has been read to the page buffer of a flash die is not the data corresponding to the next read order, the controller 4 does not read this data out from the page buffer of this flash die, but waits until the other data has been read and the read enable condition for this data is satisfied. Then, after the read enable condition of this data is satisfied, the controller 4 allocates a read buffer to this flash die and transfers the data stored in the page buffer of this flash die to the read buffer.

Figure 14:
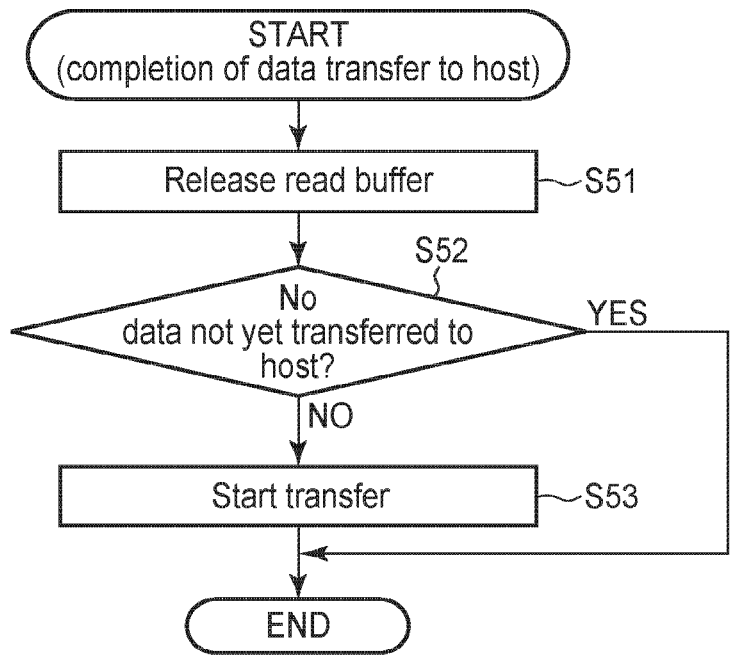
FIG. 14 is a flowchart illustrating a procedure of a process which is executed at the time of completion of data transfer to the host in the memory system according to the embodiment.

Next, the process to be executed at the time of completion of data transfer to the host will be described. FIG. 14 is a flowchart illustrating a procedure of a process which is executed at the time of completion of data transfer to the host in the memory system of the embodiment.

In response to the completion of data transfer from the read buffer to the memory 22 of the host 2 (start), the controller 4 releases the read buffer (one memory region in the read buffer 423) in which the data transferred to the memory 22 of the host 2 was stored (step S51). The released read buffer is made available for storing new data.

The controller 4 determines whether or not there is no data that has not yet been transferred to the host 2 (step S52). When there is no data that has not yet been transferred to the host 2, untransferred data that has not yet been transferred to the host 2 is not present in the read buffer 423.

Therefore, when there is no data that has not yet been transferred to the host 2 (Yes in step S52), the controller 4 ends this process.

When there is data that has not been transferred to the host 2 (No in step S52), the controller 4 transfers, to the host 2, the untransferred data that has not yet been transferred to the host 2 (step S53) and ends this process.

As explained above, according to the embodiment, when the read target data specified by the host read command is dispersed over a plurality of flash dies, it is possible to transmit a plurality of read commands corresponding to the leading data to the last data of the read target data to a plurality of different dies in the order of the leading read command to the last read command of the plurality of read commands. As a result, the read target data can be read from the flash memory 5 in the order of the leading data to the last data included in the read target data. Therefore, the read target data specified by the host read command can be transferred to the host 2 in the order of the leading data to the last data included in the read target data, without having to provide a large-capacity read buffer.

In response to a read command to be executed being stored in the next command buffer corresponding to a certain flash die (for example, flash die #m), that is, in response to the determination to transmit a certain read command to a flash die #m via the command buffer corresponding to the flash die #m, the controller 4 identifies the flash die that stores data subsequent to the data requested to be read by the read command to be executed, and the length of the subsequent data stored on this flash die. In this manner, it is possible to execute the process of identifying the flash die in which the subsequent data is stored and the length of the subsequent data while the read operation corresponding to the read command preceding the read command to be executed is being executed on the flash die #m.

Further, since the order of data transferred from each flash die to the read buffer 423 is controlled, there is no need to rearrange the data on the read buffer 423 into the order in which it should be transferred to the host 2. Therefore, the time required for sorting and the resources of the read buffer 423 can be cut down.

Thus, the controller 4 can efficiently read data from the flash die.

While certain embodiments have been described, these embodiments have been presented by way of example only, and are not intended to limit the scope of the inventions. Indeed, the novel devices and methods described herein may be embodied in a variety of other forms; furthermore, various omissions, substitutions and changes in the form of the embodiments described herein may be made without departing from the spirit of the inventions. The accompanying claims and their equivalents are intended to cover such forms or modification as would fall within the scope and spirit of the inventions.

What is claimed is:

1. A memory system comprising:
a nonvolatile memory including a plurality of dies;
a controller configured to control the plurality of dies;
a first queue provided for each of the plurality of dies, the first queue being a queue for storing a single read command associated with a read request from a host, or a leading read command of a plurality of read commands associated with a read request from the host;
a second queue provided for each of the plurality of dies, the second queue being a queue for storing any subsequent read command of the plurality of read commands; and
a command buffer provided for each of the plurality of dies, the command buffer being a buffer for storing a read command to be executed that is fetched from a queue selected from the first queue and the second queue, wherein
the controller is further configured to:
in response to the read command to be executed being stored in a first command buffer, the first command buffer being the command buffer corresponding to a first die of the plurality of dies, determine whether or not a next read command subsequent to the read command to be executed needs to be issued, based on whether or not the read command to be executed is any other read command except for the single read command and a last read command of the plurality of read commands; and
in response to determining that the next read command needs to be issued:
refer to a logical-to-physical address translation table and identify a second die of the plurality of dies in which second data subsequent to first data requested to be read by the read command to be executed is stored, and a length of the second data stored in the second die;
generate a read command to read the second data; and
execute a process of transmitting the read command to be executed to the first die, and a process of storing the generated read command in the second queue corresponding to the second die.

2. The memory system of claim 1, wherein
the controller is further configured to:
read the first data from a page buffer of the first die after completion of reading of the first data to the page buffer of the first die; and
read the second data from a page buffer of the second die after completion of both the reading of the first data to the page buffer of the first die and reading of the second data to the page buffer of the second die.

3. The memory system of claim 2, wherein
the controller is further configured to:
when the reading of the second data to the page buffer of the second die is completed while the reading of the first data to the page buffer of the first die has not been completed, wait until the reading of the first data to the page buffer of the first die is complete without reading the second data from the page buffer of the second die; and
execute a process of reading the first data from the page buffer of the first die and a process of reading the second data from the page buffer of the second die after completion of the reading of the first data to the page buffer of the first die.

4. The memory system of claim 1, wherein
the controller is further configured to:
when read commands are stored in both the first queue and the second queue corresponding to any one of the plurality of dies, select the second queue with priority over the first queue, and fetch the read command stored in the second queue as the read command to be executed.

5. The memory system of claim 2, wherein
the controller is further configured to:
in response to completion of the reading of the first data to the page buffer of the first die, allocate a first read buffer to the first die, and transfer the first data from the page buffer of the first die to the first read buffer; and
in response to completion of the reading of the first data to the page buffer of the first die:
determine whether or not the first read buffer is already allocated to the first die; and
when the first read buffer is already allocated to the first die, allocate a second read buffer to the second die, and transfer the second data from the page buffer of the second die to the second read buffer.

6. The memory system of claim 5, wherein
the controller is further configured to:
when the first read buffer is not yet allocated to the first die, allocate the second read buffer to the second die after the first read buffer is allocated to the first die.

7. The memory system of claim 1, wherein
the controller is further configured to:
in response to determining that the next read command needs to be issued, execute a process of identifying the second die in which the second data is stored and the length of the second data, and a process of calculating location information indicating a location on a memory of the host to which the second data is to be transferred.

8. A method of controlling a nonvolatile memory including a plurality of dies, the method comprising:
managing a first queue provided for each of the plurality of dies;
managing a second queue provided for each of the plurality of dies;
managing a command buffer provided for each of the plurality of dies;
storing, in the first queue provided for each of the plurality of dies, a single read command associated with a read request from a host, or a leading read command of a plurality of read commands associated with a read request from the host;
storing, in the second queue provided for each of the plurality of dies, any subsequent read command of the plurality of read commands;
storing, in the command buffer provided for each of the plurality of dies, a read command to be executed that is fetched from a queue selected from the first queue and the second queue;
determining that the read command to be executed is stored in a first command buffer, the first command buffer being the command buffer corresponding to a first die of the plurality of dies;
in response to determining that the read command to be executed is stored in the first command buffer, determining whether or not a next read command subsequent to the read command to be executed needs to be issued, based on whether or not the read command to be executed is any other read command except for the single read command and a last read command of the plurality of read commands;
determining that the next read command needs to be issued; and in response to determining that the next read command needs to be issued:
referring to a logical-to-physical address translation table and identifying a second die of the plurality of dies in which second data subsequent to first data requested to be read by the read command to be executed is stored, and a length of the second data stored in the second die;
generating a read command to read the second data; and
executing a process of transmitting the read command to be executed to the first die, and a process of storing the generated read command in the second queue corresponding to the second die.

9. The method of claim 8, further comprising:
reading the first data from a page buffer of the first die after completion of reading of the first data to the page buffer of the first die; and
reading the second data from a page buffer of the second die after completion of both the reading of the first data to the page buffer of the first die and reading of the second data to the page buffer of the second die.

10. The method of claim 9, further comprising:
determining that the reading of the second data to the page buffer of the second die is completed while the reading of the first data to the page buffer of the first die has not been completed;
in response to determining that the reading of the second data to the page buffer of the second die is completed while the reading of the first data to the page buffer of the first die has not been completed, waiting until the reading of the first data to the page buffer of the first die is complete without reading the second data from the page buffer of the second die; and
executing a process of reading the first data from the page buffer of the first die and a process of reading the second data from the page buffer of the second die after completion of the reading of the first data to the page buffer of the first die.

11. The method of claim 8, further comprising:
determining that read commands are stored in both the first queue and the second queue corresponding to any one of the plurality of dies;
in response to determining that the read commands are stored in both the first queue and the second queue corresponding to any one of the plurality of dies, selecting the second queue with priority over the first queue, and fetching the read command stored in the second queue as the read command to be executed.

12. The method of claim 9, further comprising:
determining completion of the reading of the first data to the page buffer of the first die;
in response to determining the completion of the reading of the first data to the page buffer of the first die, allocating a first read buffer to the first die, and transferring the first data from the page buffer of the first die to the first read buffer;
determining completion of the reading of the second data to the page buffer of the second die; and
in response to determining the completion of the reading of the second data to the page buffer of the second die, determining whether or not the first read buffer is already allocated to the first die.

13. The method of claim 12, further comprising:
determining that the first read buffer is not yet allocated to the first die; and
in response to determining that the first read buffer is not yet allocated to the first die, allocating the second read buffer to the second die after the first read buffer is allocated to the first die.

14. The method of claim 8, further comprising:
executing, in response to determining that the next read command needs to be issued, a process of identifying the second die in which the second data is stored and the length of the second data, and a process of calculating location information indicating a location on a memory of the host to which the second data is to be transferred.

15. The method of claim 12, further comprising:
determining that the first read buffer is already allocated to the first die; and
in response to determining that the first read buffer is already allocated to the first die, allocating a second read buffer to the second die and transferring the second data from the page buffer of the second die to the second read buffer.

* * * * *